(12) United States Patent
Milburn et al.

(10) Patent No.: US 11,709,680 B2
(45) Date of Patent: *Jul. 25, 2023

(54) SYSTEMS AND METHODS FOR POLICY EXECUTION PROCESSING

(71) Applicant: The Charles Stark Draper Laboratory, Inc., Cambridge, MA (US)

(72) Inventors: Steve E. Milburn, Sudbury, MA (US); Eli Boling, Manchester, MA (US); Andre' DeHon, Philadelphia, PA (US); Andrew B. Sutherland, Portland, OR (US); Gregory T. Sullivan, Auburndale, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,830

(22) Filed: Sep. 14, 2021

(65) Prior Publication Data

US 2021/0406028 A1 Dec. 30, 2021

Related U.S. Application Data

(63) Continuation of application No. 16/264,773, filed on Feb. 1, 2019, now Pat. No. 11,150,910.
(Continued)

(51) Int. Cl.
*G06F 9/38* (2018.01)
*G06F 21/52* (2013.01)
(Continued)

(52) U.S. Cl.
CPC ........ *G06F 9/3863* (2013.01); *G06F 9/30145* (2013.01); *G06F 12/1009* (2013.01);
(Continued)

(58) Field of Classification Search
None
See application file for complete search history.

(56) References Cited

U.S. PATENT DOCUMENTS

| | | |
|---|---|---|
| 5,201,056 A | 4/1993 | Daniel et al. |
| 5,377,336 A | 12/1994 | Eickemeyer et al. |

(Continued)

FOREIGN PATENT DOCUMENTS

| | | |
|---|---|---|
| CN | 101558388 A | 10/2009 |
| CN | 102160033 A | 8/2011 |

(Continued)

OTHER PUBLICATIONS

'18-447 Computer Architecture Lecture 11: Precise Exceptions, State Maintenance, State Recovery' by Mutlu, 2015. (Year: 2015).*

(Continued)

*Primary Examiner* — Steven G Snyder
(74) *Attorney, Agent, or Firm* — Hamilton, Brook, Smith & Reynolds, P.C.

(57) ABSTRACT

A system and method of processing instructions may comprise an application processing domain (APD) and a metadata processing domain (MTD). The APD may comprise an application processor executing instructions and providing related information to the MTD. The MTD may comprise a tag processing unit (TPU) having a cache of policy-based rules enforced by the MTD. The TPU may determine, based on policies being enforced and metadata tags and operands associated with the instructions, that the instructions are allowed to execute (i.e., are valid). The TPU may write, if the instructions are valid, the metadata tags to a queue. The queue may (i) receive operation output information from the application processing domain, (ii) receive, from the TPU, the metadata tags, (iii) output, responsive to receiving the metadata tags, resulting information indicative of the opera-
(Continued)

tion output information and the metadata tags; and (iv) permit the resulting information to be written to memory.

20 Claims, 19 Drawing Sheets

Related U.S. Application Data

(60) Provisional application No. 62/625,634, filed on Feb. 2, 2018.

(51) Int. Cl.
*G06F 12/14* (2006.01)
*G06F 21/62* (2013.01)
*G06F 21/71* (2013.01)
*G06F 9/30* (2018.01)
*G06F 12/1009* (2016.01)
*G06F 21/57* (2013.01)
*G06F 11/30* (2006.01)
*G06F 12/0875* (2016.01)

(52) U.S. Cl.
CPC .......... *G06F 12/1466* (2013.01); *G06F 21/52* (2013.01); *G06F 21/575* (2013.01); *G06F 21/6218* (2013.01); *G06F 21/71* (2013.01); *G06F 11/30* (2013.01); *G06F 12/0875* (2013.01); *G06F 2212/1052* (2013.01); *G06F 2212/206* (2013.01); *G06F 2212/452* (2013.01); *Y02D 10/00* (2018.01)

(56) References Cited

U.S. PATENT DOCUMENTS

| | | |
|---|---|---|
| 5,488,730 A | 1/1996 | Brown et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,625,146 B1 | 9/2003 | Merchant et al. |
| 6,636,523 B1 | 10/2003 | Lau et al. |
| 6,922,740 B2 | 7/2005 | Kondratiev et al. |
| 6,976,147 B1 | 12/2005 | Isaac et al. |
| 7,047,394 B1 | 5/2006 | Van et al. |
| 7,095,783 B1 | 8/2006 | Sotheran et al. |
| 7,213,247 B1 | 5/2007 | Wilner et al. |
| 7,263,572 B2 | 8/2007 | Hiji |
| 7,301,541 B2 | 11/2007 | Hansen et al. |
| 7,340,469 B1 | 3/2008 | Alghathbar et al. |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,526,757 B2 | 4/2009 | Levine et al. |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates et al. |
| 8,127,121 B2 | 2/2012 | Yates et al. |
| 8,131,663 B1 | 3/2012 | Taylor |
| 8,131,762 B2 | 3/2012 | Smetters et al. |
| 8,166,404 B2 | 4/2012 | Grinstein |
| 8,191,049 B2 | 5/2012 | Levine et al. |
| 8,271,447 B1 | 9/2012 | Natanzon et al. |
| 8,326,774 B2 | 12/2012 | Candelore |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Doering |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates et al. |
| 8,806,101 B2 | 8/2014 | Sheaffer et al. |
| 8,826,391 B2 | 9/2014 | Tkacik et al. |
| 8,874,850 B1 | 10/2014 | Goodson et al. |
| 8,875,170 B1 | 10/2014 | Daniel |
| 8,887,230 B2 | 11/2014 | Barton et al. |
| 8,904,477 B2 | 12/2014 | Barton et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinsky et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,598 B1 | 11/2016 | Bonanno et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | Dehon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,235,176 B2 | 3/2019 | Dehon et al. |
| 10,261,794 B2 | 4/2019 | Dehon |
| 10,424,043 B1 | 9/2019 | Koston et al. |
| 10,503,904 B1 | 12/2019 | Singh et al. |
| 10,521,230 B2 | 12/2019 | Dehon |
| 10,545,760 B2 | 1/2020 | Dehon |
| 10,642,616 B2 | 5/2020 | Dehon et al. |
| 10,642,753 B1 | 5/2020 | Steinberg |
| 10,719,630 B2 | 7/2020 | Chiricescu et al. |
| 10,725,778 B2 | 7/2020 | Dehon et al. |
| 10,754,650 B2 | 8/2020 | Dehon |
| 10,936,713 B2 | 3/2021 | Dehon et al. |
| 11,150,910 B2 | 10/2021 | Milburn et al. |
| 11,182,162 B2 | 11/2021 | DeHon et al. |
| 11,340,902 B2 | 5/2022 | Dehon |
| 11,417,109 B1 | 8/2022 | Theimer et al. |
| 11,507,373 B2 | 11/2022 | Dehon et al. |

(56) References Cited

U.S. PATENT DOCUMENTS

| | | |
|---|---|---|
| 11,556,664 B2 | 1/2023 | Levy et al. |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0154838 A1 | 7/2005 | Dewitt et al. |
| 2005/0155019 A1 | 7/2005 | Levine et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1* | 5/2006 | Yourst .................. G06F 9/3857 712/218 |
| 2006/0132822 A1 | 6/2006 | Walmsley |
| 2006/0143689 A1 | 6/2006 | Yu et al. |
| 2006/0242332 A1 | 10/2006 | Johnsen et al. |
| 2006/0248599 A1 | 11/2006 | Sack et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0126841 A1 | 5/2008 | Benhanokh et al. |
| 2008/0168529 A1 | 7/2008 | Anderson et al. |
| 2008/0189687 A1 | 8/2008 | Levine et al. |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113132 A1 | 4/2009 | Cain et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0178102 A1 | 7/2009 | Alghathbar et al. |
| 2009/0204785 A1 | 8/2009 | Yates et al. |
| 2009/0241097 A1 | 9/2009 | Wang et al. |
| 2009/0254543 A1 | 10/2009 | Ber et al. |
| 2010/0011209 A1 | 1/2010 | Kiriansky et al. |
| 2010/0011446 A1 | 1/2010 | Klucher et al. |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332716 A1 | 12/2010 | Sheaffer et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0297057 A1 | 11/2012 | Ghosh et al. |
| 2013/0006993 A1 | 1/2013 | Kobayashi |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood et al. |
| 2016/0170769 A1 | 6/2016 | Lemay |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |

(56) References Cited

U.S. PATENT DOCUMENTS

| | | | |
|---|---|---|---|
| 2016/0366102 A1 | 12/2016 | Smith | |
| 2016/0371496 A1 | 12/2016 | Sell | |
| 2017/0024568 A1 | 1/2017 | Pappachan et al. | |
| 2017/0048249 A1 | 2/2017 | Berrange | |
| 2017/0061160 A1 | 3/2017 | Simonov et al. | |
| 2017/0083338 A1 | 3/2017 | Burger et al. | |
| 2017/0091107 A1 | 3/2017 | Peterson et al. | |
| 2017/0126687 A1 | 5/2017 | Martinelli | |
| 2017/0126738 A1 | 5/2017 | Wilkerson et al. | |
| 2017/0177367 A1 | 6/2017 | Dehon | |
| 2017/0177368 A1 | 6/2017 | Dehon et al. | |
| 2017/0192986 A1 | 7/2017 | Isherwood et al. | |
| 2017/0220806 A1 | 8/2017 | Munoz et al. | |
| 2017/0235840 A1 | 8/2017 | Bester et al. | |
| 2017/0286119 A1 | 10/2017 | Al et al. | |
| 2017/0293563 A1 | 10/2017 | Dehon et al. | |
| 2017/0308480 A1 | 10/2017 | Wilson | |
| 2017/0329961 A1 | 11/2017 | Shanbhogue et al. | |
| 2018/0011708 A1 | 1/2018 | Dehon | |
| 2018/0046579 A1 | 2/2018 | Greenspan et al. | |
| 2018/0121650 A1 | 5/2018 | Brown | |
| 2018/0189062 A1 | 7/2018 | Baghsorkhi et al. | |
| 2018/0276085 A1 | 9/2018 | Mitkar et al. | |
| 2018/0302443 A1 | 10/2018 | Weiss et al. | |
| 2018/0336031 A1 | 11/2018 | Dehon et al. | |
| 2018/0336032 A1 | 11/2018 | Dehon et al. | |
| 2018/0336033 A1 | 11/2018 | Dehon et al. | |
| 2018/0341490 A1 | 11/2018 | Dehon et al. | |
| 2019/0034665 A1 | 1/2019 | Chiricescu et al. | |
| 2019/0155606 A1 | 5/2019 | Rotem et al. | |
| 2019/0171457 A1 | 6/2019 | Dehon et al. | |
| 2019/0205244 A1 | 7/2019 | Smith | |
| 2019/0213322 A1 | 7/2019 | Dehon et al. | |
| 2019/0236272 A1 | 8/2019 | Piatt | |
| 2019/0243655 A1 | 8/2019 | Milburn et al. | |
| 2019/0243768 A1 | 8/2019 | Doshi et al. | |
| 2019/0354675 A1 | 11/2019 | Gan et al. | |
| 2019/0384604 A1 | 12/2019 | Dehon et al. | |
| 2019/0392146 A1 | 12/2019 | Gezalov et al. | |
| 2019/0392147 A1 | 12/2019 | Gezalov et al. | |
| 2020/0089500 A1 | 3/2020 | Dehon | |
| 2020/0201576 A1 | 6/2020 | Yudanov et al. | |
| 2020/0387374 A1 | 12/2020 | Dehon | |
| 2021/0004231 A1 | 1/2021 | Dehon | |
| 2021/0026934 A1 | 1/2021 | Boling et al. | |
| 2021/0042100 A1 | 2/2021 | Boling et al. | |
| 2021/0073375 A1 | 3/2021 | Milburn et al. | |
| 2021/0075797 A1 | 3/2021 | Gan et al. | |
| 2022/0043654 A1 | 2/2022 | DeHon et al. | |

FOREIGN PATENT DOCUMENTS

| | | |
|---|---|---|
| CN | 104794067 A | 7/2015 |
| GB | 2519608 A | 4/2015 |
| JP | 2013-242633 A | 12/2013 |
| TW | 201333722 A | 8/2013 |
| WO | 2010/028316 A1 | 3/2010 |
| WO | 2015/047295 A1 | 4/2015 |
| WO | 2015/183481 A1 | 12/2015 |
| WO | 2017/106101 A2 | 6/2017 |
| WO | 2017/106103 A1 | 6/2017 |
| WO | 2019/152795 A1 | 8/2019 |
| WO | 2020/097177 A1 | 5/2020 |
| WO | 2020/150351 A1 | 7/2020 |
| WO | 2021/076871 A1 | 4/2021 |
| WO | 2021/092138 A1 | 5/2021 |

OTHER PUBLICATIONS

Search Query Report from IP.com (dated Nov. 19, 2021) (Year: 2021).
Search Query Report from IP.com (dated Sep. 7, 2022) (Year: 2022).
Alves-Foss et al., Evaluating the Use of Security Tags in Security Policy Enforcement Mechanisms, IEEE, 2015.
Amorim et al., A Verified Information—Flow Architecture, ACM, Jan. 2014.
DeAmorim, et al, Micro-Policies: Formally Verfied, Tag-Based Security Monitors:, 2015 IEEE Symposium on Security and Privacy, pp. 813-830, May 1, 2015.
Dhawan, et al. "PUMP: A Programmable Unit for Metadata Processing", In Proceedings of the 3rd International Workshop on Hardware and Architectural Support for Security and Privacy, Jun. 2014.
Dhawan, et al., "Architectural Support for Software-Defined Metadata Processing," University of Pennsylvania, ASPLOS, Mar. 14-18, 2015.
Dhawan, et al., "Area-Efficient Near-Associative Memories on FPGAs", University of Pennsylvania, ACM Transactions Jn Reconfigurable Technology and Systems, vol. 7, No. 4, Jan. 2015.
Evans, et al., "Melding Security Metadata between software and hardware", ACM, Dec. 2012.
Google Search Results—"metadata processing with tag and cache of rules"; Jan. 13, 2021.
International Search Report and Written Opinion received for PCT Patent Application No. PCT/US2016/066188, dated Jul. 13, 2017, 24 pages.
International Search Report and Written Opinion received for PCT Patent Application No. PCT/US2016/066194, dated Apr. 7, 2017, 12 pages.
International Search Report and Written Opinion received for PCT Patent Application No. PCT/US2019/016242, dated Mar. 29, 2019, 12 pages.
International Search Report and Written Opinion received for PCT Patent Application No. PCT/US2019/016272, dated Apr. 8, 2019, 11 pages.
International Search Report and Written Opinion received for PCT Patent Application No. PCT/US2019/016295, dated Jun. 26, 2019, 16 pages.
Juglarel, et al., "Towards a Fully Abstract Complier Using Micro-Policies", Secure Compilation for Mutaully Distrustful Component, Oct. 2015.
Kannan, H., et al., "Decoupling Dynamic Information Flow Tracking with a Dedicated Coprocessor", IEEE, 2009.
Mambretti Andrea et al: "Trellis: Privilege Separation for Multi-user Applications Made Easy", Sep. 7, 2016 (Sep. 7, 2016), Proc. Int.Conf. Adv. Biometrics (ICB); [Lecture Notes in Computer Science; Lect.Notes Computer], Springer, Berlin, Heidelberg, pp. 437-456.
Search Query Report from IP.Com (dated May 21, 2020).
Search Query Report from IP.com (dated Mar. 15, 2020).
Search query report from IP.com (dated Apr. 14, 2020).
Search Query Report from IP.Com (dated Nov. 21, 2020).
Slides from presentation DOVER: A Metadata-extended RISC-V, RISC-V Workshop, Oracle Conference Center in Redwood Shores, CA. Jan. 6, 2016.
Song , J., et al., Security Tagging fora Zero-Kernel Operating System, IEEE, 2013.
Song, W., et al., "The 4th lowRISC Release: Tagged Memory and Minion Cores," University of Cambridge, May 10, 2017, retrieved at https://riscv.org/wpcontent/uploads/2017/05/Wed0930riscv201705_ppt.pdf, pp. 1-20.
Sullivan et al., The Dover inherently secure processor. 2017 IEEE International Symposium on Technologies for Homeland Security (HST) Apr. 25, 2017:1-5.
Tiwari el. al, A Small Cache of Large Ranges: Hardware Methods for Efficiently Searching, Storing, and Updating Big V Dataflow Tags, Proceedings of the 41st annual IEEE/ACM International Symposium on Microarchitecture, pp. 94-105 (2008).
Watson, et al., "Capability Hardware Enhanced RISC Instructions: CHERI Instruction-Set Architecture", Univ. of Cambridge, Sep. 2015.
Woodruff et al., "CHERI: A RISC cabality machine for practical memory safety", Univ of Cambridge, Jul. 2014.
Zeldovich et. al, Hardware Enforcement of Application Security Policies Using Tagged Memory, Proceedings of the 8th USENIX conference on Operating systems design and implementation pp. 225-240 (2008).

(56) References Cited

OTHER PUBLICATIONS

Search Query Report from IP.com (dated Mar. 11, 2022) (Year: 2022).
Search Query Report from IP.com (dated Mar. 25, 2022) (Year: 2022).
Search Query Report from IP.com (dated Jan. 17, 2023) (Year: 2023).
Search Query Report from IP.com (dated Oct. 20, 2022) (Year: 2022).
Search Query Report from IP.com (dated Feb. 23, 2023) (Year: 2023).

* cited by examiner

PIPE Registers

| Address | Bit(s) | Name | Access | Description |
|---|---|---|---|---|
| 0x000 | | PipeState | | State of PIPE |
| | 0 | RuleMiss | R | A Rule Miss has occurred |
| | 2 | TMT_IMiss | R | Tag Map Table had no entry for Instruction Address |
| | 3 | TMT_DMiss | R | Tag Map Table had no entry for Data Address |
| | 4 | InputFull | R | Input FIFO is full |
| | 5 | InputEmpty | R | Input FIFO is empty |
| 0x008 | 9:0 | InputFifoCnt | R | Count of PIPE input FIFO |
| 0x028 | 31:0 | RCMissCnt | R/W | Counter of PIPE Rule Cache Misses |
| 0x030 | 31:0 | RCHitCnt | R/W | Counter of PIPE Rule Cache Hits |
| 0x080 | 3:0 | APIRQ | W/HC | Generates interrupt pulses to the AP (through a Platform Interrupt Controller). Up to 4 interrupts may be generated depending on the bits set in the word written. |
| 0x088 | | APCtrl | R/W | |
| | 31:2 | APMtvec[31:2] | R/W | Sets the reset mvec value to the AP. Bits [1:0] are always zero. Default = 0x100 |
| | 0 | APResetn | R/W | Put the AP in reset when 0, releases reset when 1. Defaults to 0 to keep AP in reset while PEX boots. Default = 0 |
| 0x098 | 31:0 | InputFlush | R/W | Any value written clears PIPE input FIFO and sends interrupt to AP. Automatically clears to zero |
| 0x0A0 | 31:0 | RCFlush | R/W | Write to this address triggers PIPE Rule Cache flush. Automatically clears to zero |
| 0x100 | | MissInstr | | Instruction/Opgroup bits for rule miss |
| | 9:0 | MissOpgrp | R | Opgroup bits for rule miss |
| | 31:10 | MissInstr | R | Non-opcode instruction bits for rule miss |
| 0x108 | | MissLSBs | R | LSBs of the instruction and data addresses for a rule miss |
| | 2:0 | MissLSBD | R | LSBs of the data address for a rule miss |
| | 5:4 | MissLSBI | R | LSBs of the instruction address for a rule miss |
| 0x110 | 31:0 | MissPC | R | PC (Program Counter) tag for rule miss |
| 0x118 | 31:0 | MissCI | R | CI (Current Instruction) tag for rule miss |
| 0x120 0x128 0x130 | 31:0 | MissOP[n] | R | RS[n] (Register Source) tag for rule miss |
| 0x180 | 31:0 | MissDataVA | R | Virtual address of Data Memory accessed for rule miss |

FIG. 7A

PIPE Registers (continued)

| Address | Bit(s) | Name | Access | Description |
|---|---|---|---|---|
| 0x188 | 31:0 | MissDataPA | R | Physical address of Data Memory accessed for rule miss |
| 0x190 | 31:0 | MissDataTagPA | R | Physical address of Data Memory Tag for rule miss |
| 0x198 | 31:0 | MissInstrVA | R | Virtual Address of current instruction for rule miss |
| 0x1A0 | 31:0 | MissInstrPA | R | Physical Address of current instruction for rule miss |
| 0x1A8 | 31:0 | MissInstrTagPA | R | Physical Address of CI Tag for rule miss |
| 0x200 0x208 0x210 0x218 | 9:0 | MissHash[n] | | Address hash of the input key of the miss Value of the first hash of the rule inputs (address into first Rule Cache set), and accounting bits of the entry at that location in the Rule Cache set (valid, aging) |
| 0x240 0x246 0x248 0x256 | | MissInfo[n] | R | Information about the entry at the address of MissHash[n] |
| | 15:0 | MissInstallCnt[n] | R | 16-bit installation count from when this rule cache entry was installed. Used by hardware to generate the Least Recently Installed (LRI) candidate for rule installation, which is written into WrWayDest when WrCopy is used. |
| | 23:20 | MissScratch[n] | R | Scratch bits for SW |
| | 24 | MissLock[n] | R | Lock bit for LRU algorithm |
| | 31 | MissValid[n] | R | Flag to indicate the rule cache entry is valid |
| 0x300 | 31:0 | WrInstr | R/W | Instr/OpGroup value to be installed |
| | 9:0 | WrOpgrp | R | Opgroup bits value to be installed |
| | 31:10 | WrInstr | R | Non-opcode instruction bits value to be installed |
| 0x308 | | WrLSBs | | Address and Data LSBs to be installed |
| | 2:0 | WrLSBD | R/W | LSBs of the data address for a rule miss |
| 0x310 | 31:0 | WrPC | R/W | PCtag value to be installed |
| 0x318 | 31:0 | WrCI | R/W | CItag value to be installed |
| 0x320 0x328 0x330 | 31:0 | WrOp[n] | R/W | Op[n] tag value to be installed. Depending on the ISA, may be used for result tags when an instruction has more destinations than WrR#Tags available. Which WrOp[n] entry is used for a particular destination tag depends on the ISA. For RISC-V, for example, CSR instructions use WrOp[3] for the result tag on the CSR. |
| 0x380 | | WrDest | R/W | |

FIG. 7B

PIPE Registers (continued)

| Address | Bit(s) | Name | Access | Description |
|---|---|---|---|---|
| | 3:0 | WrWayDest | R/W | Indicates which Rule Cache way(s) to install the rule to. |
| | 23:20 | WrScratch | R/W | Bits usable by SW for accounting |
| | 24 | WrLock | R/W | Lock bit for LRU algorithm |
| | 31 | WrInValid | R/W | Marks the entry as invalid when committed. Useful for removing a rule from the cache. |
| 0x388 | 31:0 | WrTransID | R/W | Current transaction id |
| 0x390 | 31:0 | WrCopy | R/W | Triggers a copy of the values in the Miss* registers into the corresponding Wr* registers if the value written here matches the value in WrTransID. The copy happens atomically in a single cycle. During the copy, the HW calculated Least Recently Installed way, or the first invalid way, is written to WrWayDest |
| 0x3A0 | 31:0 | WrCommit | R/W | Triggers write to PIPE Rule Cache if value matches TransID |
| 0x3A8 | 31:0 | WrResume | R/W | Triggers a resume in the PIPE using the results supplied for the missed input values if the value written matches TransID |
| 0x408 | 31:0 | WrRPCTag | R/W | Result tag for the PC tag. Some values are reserved to indicate the result tag is to be copied from an input tag. 0=Writes zeros 1=Copy PC tag 2=Copy CI tag 3=Copy OP1 tag 4=Copy OP2 tag 5=Copy OP3/Memory tag 6+=Writes the value as the tag |
| 0x410 | 31:0 | WrR1Tag | R/W | Result tag for the first destination of an instruction. Same interpretation as WrRPCtag |
| 0xD00 | 5:0 | TMT_Entry | R/W | Entry Number for write to Tag Map Table plus valid bit and tag bit |
| 0xD08 | 1:0 | TMT_Type | R/W | Specifies Entry type and valid |
| | 0 | TMT_IValid | R/W | Sets the Tag Map Table entry specified in TMT_Entry as valid or invalid for CI Tag address mapping when TMT_Value is written |
| | 1 | TMT_DValid | R/W | Sets the Tag Map Table entry specified in TMT_Entry as valid or invalid for Memory Tag address mapping when TMT_Value is written |

FIG. 7C

PIPE Registers (continued)

| Address | Bit(s) | Name | Access | Description |
|---|---|---|---|---|
| | 1 | TMT_DValid | R/W | Sets the Tag Map Table entry specified in TMT_Entry as valid or invalid for Memory Tag address mapping when TMT_Value is written |
| | 2 | TMT_Imm | R/W | Indicates that the mapping for this page is always to the tag specified in TMT_Value, not to a memory page to fetch a tag from. This can be used as a performance/power/memory enhancement when an entire page has the same tag, and as a way to supply tags for peripheral devices. |
| | 5:4 | TMT_Size | R/W | Indicates the size of the tags to be fetched from memory when this mapping is used.<br>00 = Byte<br>01 = Half word (2 bytes)<br>10 = Word (4 bytes)<br>11 = Reserved for double word in future |
| | 10:8 | TMT_Shift | R/W | Indicates the number of nibbles the input physical address is shifted right after masking before being OR'd with TMT_Val to generate the physical tag address. |
| 0xD10 | 31:0 | TMT_Addr | R/W | Physical Address value being mapped |
| 0xD18 | 31:0 | TMT_Mask | R/W | Mask to apply to physical addresses before compare to TMT_Addr |
| 0xD20 | | TMT_Val | R/W | Output value for Tag Map Table entry. Writing this register causes a write to the Tag Map Table |
| | 19:0 | TMT_Page[19:0] | R/W | When TMT_Imm=0, specified the physical page address of the tag for the page address given in TMT_Entry. When TMT_Imm=1, becomes the lower bits of the tag. |
| | 31:20 | TMT_Tag[31:20] | R/W | Upper bits of tag when TMT_Imm=1 |
| 0xD28 | 31:0 | TMT_Miss_IPA | R | Address of the instruction physical address that caused the last TMT_IMiss interrupt |
| 0xD30 | 31:0 | TMT_Miss_DPA | R | Address of the memory physical address that caused the last TMT_DMiss interrupt |
| 0xD38 | 31:0 | TMT_Miss_Instr | R | Instruction that generated the last TMT_I_Miss or TMT_D_Miss. |
| 0xE00 | 0 | OpgrpEn | R/W | Enable the use of Op Group/Care table. When disabled, opcode is used directly in the key and all input cares are always set. Default = 0 |

FIG. 7D

PIPE Registers (continued)

| Address | Bit(s) | Name | Access | Description |
|---|---|---|---|---|
| 0xE08 | 9:0 | OpgrpAddr | R/W | Address for write to opgroup/care table. |
| 0xE10 | | OpGrpValue | R/W | Data for write to opgroup/care table. Causes table write |
| | 9:0 | OpGrp | R/W | The group the OpCode+Funct3 specified belongs to |
| | 31:10 | CareInstr[21:6] | R/W | Instruction care bits for portions of the instruction not used as OpCode |
| 0xE18 | | OpgrpCares | R/W | Data for write to opgroup/care table |
| | 2:0 | CareLSBD | R/W | Care bits for the LSBs of the data address |
| | 4:3 | CareLSBI | R/W | Care bits for the LSBs of the instruction address |
| | 5 | CarePC | R/W | Care bit for the PC Tag |
| | 6 | CareCI | R/W | Care bit for the CI Tag |
| | 7 | CareM | R/W | Care bit for the M Tag |
| | 10:8 | CareOP[n] | R/W | Care bit for the OP[n] Tag |
| 0x8000 0x8008 ... | 31:0 | TagMem[n] | R/W | Current tag on AP's Register Files and CSRs. See Table 4 for address mapping of specific ISA. |
| 0x8F00 | 31:0 | PCtag | R/W | Current value of PC Tag |
| 0x8F10 | 31:0 | PCtagSave0 | R/W | Value of PC tag at assertion of interrupt event 0 |
| 0x8F18 | 31:0 | PCtagSave1 | R/W | Value of PC tag at assertion of interrupt event 1 |
| 0xC000 0xC008 ... | 31:0 | ShadowMem[n] | R/W | Shadow value of AP's Register Files and CSRs. Same ISA-specific address mapping as TagMem[n] |
| 0xCF00 | 31:0 | ShadowPC | R | PC of last validated instruction |
| 0xCF10 | 31:0 | ShadowPCSave0 | R | PC of instruction aborted in PIPE at assertion of interrupt event 0 |
| 0xCF18 | 31:0 | ShadowPCSave1 | R | PC of instruction aborted in PIPE at assertion of interrupt event 1 |

FIG. 7E

LUT Care Bits

| Address | Description |
|---|---|
| 9:0 | OP Group |
| 31:10 | Instruction Care (not including OPCODE bits) |
| 32 | PCtag Care |
| 33 | CItag Care |
| 34 | Mtag Care |
| 36:35 | Instr LSB[1:0] (bit 1 is meaningless for a 32-bit system). Enables support of sub-instructions for systems with multiple instructions in a single native word. |
| 39:37 | Data LSB[2:0] cares (bit 2 is meaningless in a 32-bit system). Multiple its enable specifying exactly how many LSBs the OPGRP uses. |
| 40 | OP1tag Care |
| 41 | OP2tag Care |
| 42 | OP3tag Care |

FIG. 8

TPU Communication Parameters

| Parameter Name | Value | Description |
|---|---|---|
| RESET_POL | 1'b0 | Polarity of asserted reset. 1'b0 indicates active-low reset. |
| CACHE_WAY_DEPTH | 1024 | Depth of each Rule Cache Way |
| CACHE_WAYS | 4 | Number of Rule Cache Ways |
| PA_WIDTH | 32 | Width of physical address |
| DATA_WIDTH | 32 | Width of native word size |
| TAG_WIDTH | 32 | Width of tags |
| IN_FIFO_DEPTH | 128 | Depth of input FIFO from CPU |
| MEM_FIFO_DEPTH | 16 | Depth of Stage 3 FIFOs |
| NUM_IRQ | 4 | Number of IRQs that the PEX can generate via the TPU's SFRs |

FIG. 9A

TPU Communication Interfaces

| Interfaces | Partner | Description |
|---|---|---|
| Bus_cpu_tpu | AP CPU Core | Stream of committed instructions and related data from the CPU core. |
| Bus_imem | AXI Fabric | Memory access port for reading CI Tags |
| Bus_dmem | MTIQ | Memory access port for reading Memory Tags |
| Bus_sfrs | AXI Fabric | Target AXI interface for TPU SFRs and shadow RAMs |
| Bus_mtiq | MTIQ | Simple interface to send tag writes to MTIQ |

FIG. 9B

TPU Communication Interface Inputs

| Inputs | Source | Description |
|---|---|---|
| Clock | Cpu-clk | CPU Clock |
| Reset | Power-on Reset | Reset signal |
| imem_id | Constant at SOC top | AXI ID for TPU fetches of CI tags |
| dmem_id | Constant at SOC top | AXI ID for TPU fetches of Data tags |
| Non_tag_addr | Constant at SOC top | Special address sent to MTIQ when memory write used an immediate tag from TMT |

FIG. 9C

TPU Communication Interface Outputs

| Outputs | Description |
|---|---|
| Pipe_pex_irq | Interrupt request to PEX to service misses |
| Ap_nrst | Active-low reset to AP |
| Ap_tvec | Reset vector to AP |

FIG. 9D

TPU ISA Parameters

| Parameter Name | Value | Description |
|---|---|---|
| INSTR_WIDTH | 32 | Width of instruction word |
| OPCODE_WIDTH | 10 | Number of Opcode bits used to address operation group/care LUT |
| OPGRP_WIDTH | 10 | Width of OPGRP output |
| OP_ADDR_WIDTH | 12 (for CSR) | Max size address of all operand types |
| NUM_OPS | 3 | Max number of operands in any one instruction |
| NUM_OP_TYPES | 3 (CSR, FP RF, Integer RF) | Number of independent operand types |
| NUM_DESTS | 3 (CSR & RD on CSR Swapr) | Max number of destinations in an instruction |
| NUM_OP_TAGS | 130 | Number of unique operand tags needed for all operand types in the CPU |
| DED_MR_KEY_SLOT | 0 | Indicates if the tag read from Memory has a dedicated slot in the rule key, or if it shares a slot with the last operand number (0=shared, 1=dedicated) |
| INSTR_OPCODE_MASK | 32'h0000_707F (funct3+Opcode) | Mask to specify position of Opcode bits in instruction. |

FIG. 10

Address Map for TagMem and ShadowMem

| PIPE TagMem / ShadowMem Offset | AP Register File/CSR Name | AP RF/CSR Address |
|---|---|---|
| 0x0 – 0x7F | Integer Registers 0-31 | 0-31 |
| 0x80 | CSR fflags, frm, fcsr | 0x001-0x003 |
| 0x84 | CSR cycle, cycleh, cyclew, cyclehw | 0xC00, 0xC80, 0x900, 0x980 |
| 0x88 | CSR time, timeh, timew, timehw | 0xC01, 0xC81, 0x901, 0x981 |
| 0x8C | CSR instret, instreth, instretw, instrethw | 0xC02, 0xC82, 0x902, 0x982 |
| 0x90 | CSR sstatus | 0x100 |
| 0x94 | CSR stvec | 0x101 |
| 0x98 | CSR sie | 0x104 |
| 0x9C | CSR stimecmp | 0x121 |
| 0xA0 | CSR stime, stimeh, stimew, stimehw | 0xD01, 0xD81, 0xA01, 0xA81 |
| 0xA4 | CSR sscratch | 0x140 |
| 0xA8 | CSR sepc | 0x141 |
| 0xAC | CSR scause | 0xD42 |
| 0xB0 | CSR sbadaddr | 0xD43 |
| 0xB4 | CSR sip | 0x144 |
| 0xB8 | CSR sptbr | 0x180 |
| 0xBC | CSR sasid | 0x181 |
| 0xC0 | CSR mcpuid | 0xF00 |
| 0xC4 | CSR mimpid | 0xF01 |
| 0xC8 | CSR mhartid | 0xF10 |
| 0xCC | CSR mstatus | 0x300 |
| 0xD0 | CSR mtvec | 0x301 |
| 0xD4 | CSR mideleg | 0x302 |
| 0xD8 | CSR mie | 0x304 |
| 0xDC | CSR mtimecmp | 0x321 |
| 0xE0 | CSR mtime | 0x701 |
| 0xE4 | CSR mtimeh | 0x741 |
| 0xE8 | CSR mscratch | 0x340 |
| 0xEC | CSR mepc | 0x341 |
| 0xF0 | CSR mcause | 0x342 |
| 0xF4 | CSR mbadaddr | 0x343 |
| 0xF8 | CSR mip | 0x344 |
| 0xFC | CSR mbase | 0x380 |
| 0x100 | CSR mbound | 0x381 |
| 0x104 | CSR mibase | 0x382 |
| 0x108 | CSR mibound | 0x383 |
| 0x10C | CSR mdbase | 0x384 |
| 0x110 | CSR mdbound | 0x385 |

FIG. 11

MTIQ Interface Parameters

| Parameter Name | Value | Description |
|---|---|---|
| PA_WIDTH | 32 | Width of physical address |
| BUS_WIDTH | 32 | Width of system's AXI bus |
| TAG_WIDTH | 32 | Width of tags |
| FIFO_DEPTH | 128 | Depth of input FIFO from CPU |

FIG. 12A

MTIQ Interfaces

| Interfaces | Partner | Description |
|---|---|---|
| Bus_cpu_pipe | AP CPU Core | Stream of committed instructions and related data from the CPU core |
| Bus_cpu_mtiq | CPU Data AXI Interface | CPU's data read and write AXI port |
| Bus_pipe_mtiq | PIPE Data AXI Interface | PIPE's data tag read and write AXI port |
| Bus_cpu_dmem | AXI Fabric | AXI port for CPU reads, and MTIQ data writes on behalf of CPU |
| Bus_pipe_dmem | AXI Fabric | AXI port for PIPE reads and MTIQ data writes on behalf of PIPE |

FIG. 12B

MTIQ Interface Inputs

| Inputs | Source | Description |
|---|---|---|
| Clock | Cpu_clk | CPU clock |
| Reset | Power-on Reset | Power on reset |
| Invalid_tag_value | PIPE SFRs | The special tag value to be written in the first stage of an MTIQ write |
| Non_tag_addr | PIPE SFRs | The special address that indicates a write is allowed without a corresponding tag write |

FIG. 12C

SYSTEMS AND METHODS FOR POLICY EXECUTION PROCESSING

RELATED APPLICATIONS

This application is a continuation of U.S. application Ser. No. 16/264,773 filed Feb. 1, 2019 which claims the benefit of U.S. Provisional Application No. 62/625,634, filed on Feb. 2, 2018. The entire teachings of the above applications are incorporated herein by reference.

BACKGROUND

The present disclosure relates generally to systems and methods for policy execution processing, for example, to enforce security policies. Computer processors, which include electronic circuits configured to execute one or more computer program instructions, are known. Furthermore, it is known to implement security policies to prevent a computer processor from compromising sensitive information.

SUMMARY

In one aspect, the disclosure is directed to a processing system comprising a host processing domain comprising a host processor. The host processor may be configured to receive at least one instruction comprising (i) operand information relating to one or more operands, and (ii) operation information indicative of an operation to be performed on the one or more operands. The host processor may be further configured to execute the operation indicated in the operation information on the one or more operands to generate operation output information, and to provide, to a metadata processing domain, instruction information and the operation output information. The metadata processing domain may comprise a write interlock, which may be configured to receive, from the host processing domain, the operation output information, and place the operation output information into a queue. The metadata processing domain may further comprise a tag processing unit configured to receive, from the host processing domain, the instruction information, and use the instruction information to obtain one or more input metadata tags associated with the at least one instruction. The tag processing unit may further determine, in accordance with one or more policies being enforced and in accordance with the one or more input metadata tags associated with the at least one instruction, whether the at least one instruction is allowed. The tag processing unit may, responsive to a determination that the instruction is allowed, cause the queue of the write interlock to write to memory the operation output information in a manner that associates the operation output information with at least one output metadata tag.

The tag processing unit may comprise a rule cache configured to store one or more rule entries of at least one policy of the one or more policies enforced by the metadata processing domain.

The determination that the instruction is allowed may comprise determine that the rule cache stores a rule entry matching the one or more input metadata tags associated with the at least one instruction. The tag processing unit may be configured to use information stored in the rule entry to provide the at least one output metadata tag to be associated with the operation output information.

The metadata processing domain may comprise a policy execution processor. The determination that the instruction is allowed may comprise (i) determine that the rule cache does not store a rule entry matching the one or more input metadata tags associated with the at least one instruction, (ii) responsive to a determination that the rule cache does not store a rule entry matching the one or more input metadata tags associated with the at least one instruction, provide, to the policy execution processor, the one or more input metadata tags associated the at least one instruction, and (iii) receive, from the policy execution processor, the at least one output metadata tag to be associated with the operation output information.

The policy execution processor may be configured to receive, from the tag processing unit, the one or more input metadata tags associated with the at least one instruction, and execute policy code against the one or more input metadata tags associated with the at least one instruction to determine whether the at least one instruction is allowed. Responsive to a determination that the at least one instruction is allowed, the policy execution processor may be further configured to install, into the rule cache, a rule entry based on the one or more input metadata tags associated with the at least one instruction and the at least one output metadata tag.

The policy execution processor may be configured to execute a secure boot operation. The policy execution processor may comprise a boot ROM that stores one or more public keys, and along with code that can (i) read an image from an external memory device, authenticate and decrypt the image using the one or more public keys, and enable the host processor to continue its boot process upon successful authentication and decryption.

The boot operation may comprise at reset, the host processor remains held in a reset state. The policy execution processor may (i) start execution at its reset vector, (ii) boot the policy software into its own memory space, (iii) configure one or more memory fabric protection configuration registers to define memory regions that each initiator can access, to protect a region of memory to hold a policy data segment, (iv) initialize the policy data segment, (v) copy a boot-loader for the host processor from the external memory device into main memory; and (vii) release the host processor from the reset state.

The host processor may be further configured to provide, to the metadata processing domain, update information indicative of one or more updates to the host processor's state as a result of executing the at least one instruction. The metadata processing domain may be further configured to, responsive to a determination that the at least one instruction is allowed, use the update information to update a shadow register configured to store a shadow copy of the host processing domain as of a most-recently-allowed instruction. The at least one instruction may comprise a first instruction. the instruction information may comprise first instruction information, and the one or more input metadata tags comprise one or more first input metadata tags. The tag processing unit may be further configured to (i) receive, from the host processing domain, second instruction information relating to a second instruction executed by the host processor, (ii) use the second instruction information to obtain one or more second input metadata tags associated with the second instruction, (iii) determine, in accordance with the one or more policies being enforced and in accordance with the one or more second metadata tags associated with the second instruction, whether the second instruction is allowed, and (iv) responsive to a determination that the second instruction is not allowed, communicate one or more rollback signals to the host processing domain to restore a state of the host processing domain to the shadow copy of the host processing domain.

The one or more input metadata tags may be inaccessible to the host processor.

The instruction information may comprise at least one piece of information selected from a group consisting of (i) information indicative of an instruction type of the at least one instruction, (ii) information indicative of a memory address from which the at least one instruction was fetched (iii) information indicative of one or more registers used by the at least one instruction, and (iv) information indicative of a memory address referenced by the at least one instruction.

In another aspect, the disclosure is directed to a processing system comprising an application processing domain comprising an application processor configured to implement a first instruction set architecture, and receive instructions comprising operand information indicative of one or more operands, and operation information indicative of an operation to be performed on the one or more operands. The instructions may be formatted in accordance with the first instruction set architecture. The application processing domain may further provide, to a metadata processing domain, the instructions in an instruction stream. The metadata processing domain may comprise a tag processing unit that may comprise at least one decode table. The tag processing unit may be configured to extract the operand information and the operation information from the instructions.

The tag processing unit may comprise at least one look-up table configured to determine, based on the instructions, instruction care bit information indicative of one or more care bits, and operation group information indicative of an operation group.

The tag processing unit may be further configured to determine, based on the at least one decode table, that the instructions are formatted in accordance with the first instruction set architecture. The determination that the instructions are formatted in accordance with the first instruction set architecture may be further based on the instruction care bit information indicative of the one or more care bits and the operation group information indicative of an operation group. The at least one decode table may comprise a cascade of tables of at least a primary table, a secondary table, and a plurality of address lookup tables.

The tag processing unit may further comprise a buffered interface configured to store the instructions from the application processor when the tag processing unit is stalled, and to provide stored instructions for use by the tag processing unit when the instruction stream is stalled. The buffered interface may comprise a first-in-first-out (FIFO) component.

The tag processing unit may further comprise a tag map table (TMT) configured to convert one or both of a physical instruction address and a data memory page address, into one or both of (i) a corresponding associated tag addresses and (ii) directly into a tag. The TMT may be configured to accommodate an immediate value tag, specified for a particular size of a memory region. The particular size may be selected from a range of memory region sizes.

The metadata processing domain may further comprise a Metadata Tag Interlock Queue configured to (i) perform a first write to change a tag address to a predetermined constant value that indicates a write transaction is underway, (ii) perform a second write to write new data, and (iii) perform a third write to write a new tag associated with the new data.

In another aspect, the disclosure is directed to a method of processing instructions, comprising, in a host processing domain, by an application processor, receiving each of the instructions comprising (i) operand information relating to one or more operands, and (ii) operation information indicative of an operation to be performed on the one or more operands. The method may further comprise executing the operation indicated in the operation information on the one or more operands to generate operation output information, and providing, to a metadata processing domain, instruction information and the operation output information. The method may further comprise, in the metadata processing domain, by a write interlock, receiving, from the host processing domain, the operation output information, and placing the operation output information in a queue. The method may further comprise, by a tag processing unit, (i) receiving, from the host processing domain, the instructions information, (ii) using the instruction information to obtain one or more input metadata tags associated with the at least one instruction, (iii) determining, in accordance with one or more policies being enforced and in accordance with the one or more input metadata tags associated with the at least one instruction whether the at least one instruction is allowed, and (iv) responsive to determining that the instruction is allowed, causing the queue of the write interlock to write to memory the operation output information in a manner that associates the operation output information with at least one output metadata tag.

The tag processing unit may comprise a rule cache configured to store one or more rule entries of at least one policy of the one or more policies enforced by the metadata processing domain. Determining that the instructions are allowed may comprise determining that the rule cache stores a rule entry matching the one or more input metadata tags associated with the at least one instruction.

The method may further comprise using, by the tag processing unit, information stored in the rule entry to provide the at least one output metadata tag to be associated with the operation output information.

The metadata processing domain may comprise a policy execution processor. Determining that the instructions are allowed may comprise (i) determining that the rule cache does not store a rule entry matching the one or more input metadata tags associated with the at least one instruction, (ii) responsive to a determination that the rule cache does not store a rule entry matching the one or more input metadata tags associated with the at least one instruction, providing, to the policy execution processor, the one or more input metadata tags associated the at least one instruction, and (iii) receiving, from the policy execution processor, the at least one output metadata tag to be associated with the operation output information.

The method may further comprise, by the policy execution processor, (i) receiving, from the tag processing unit, the one or more input metadata tags associated with the at least one instruction, (ii) executing policy code against the one or more input metadata tags associated with the at least one instruction to determine whether the at least one instruction is allowed, and (iii) responsive to a determination that the at least one instruction is allowed, installing into the rule cache, a rule entry based on the one or more input metadata tags associated with the at least one instruction and the at least one output metadata tag.

The method may further comprise, by the host processor, providing to the metadata processing domain, update information indicative of one or more updates to the host processor's state as a result of executing the at least one instruction; and by the metadata processing domain, responsive to a determination that the at least one instruction is allowed, using the update information to update a shadow register configured to store a shadow copy of the host processing domain as of a most-recently-allowed instruction.

The at least one instruction may comprise a first instruction, the instruction information comprises first instruction information, and the one or more input metadata tags comprise one or more first input metadata tags. The method may further comprise, by the tag processing unit, (i) receiving, from the host processing domain, second instruction information relating to a second instruction executed by the host processor, (ii) using the second instruction information to obtain one or more second input metadata tags associated with the second instruction, (iii) determining, in accordance with the one or more policies being enforced and in accordance with the one or more second metadata tags associated with the second instruction, whether the second instructions is allowed, and (iv) responsive to a determination that the second instruction is not allowed, communicating one or more rollback signals to the host processing domain to restore a state of the host processing domain to the shadow copy of the host processing domain.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 7A through 7E depict an example set of PIPE Registers as described herein.

FIG. 8 depicts an example set of care bits as described herein.

FIGS. 9A through 9D depict an example TPU communication interface as described herein.

FIG. 10 shows parameters of an example ISA-specific header file as described herein.

FIG. 11 depicts an example mapping between shadow memory, RF/CSR name, and RF/CSR address, as described herein.

FIGS. 12A, 12B, and 12C show example communication information used by the MTIQ, as described herein.

DETAILED DESCRIPTION

Figure 1:
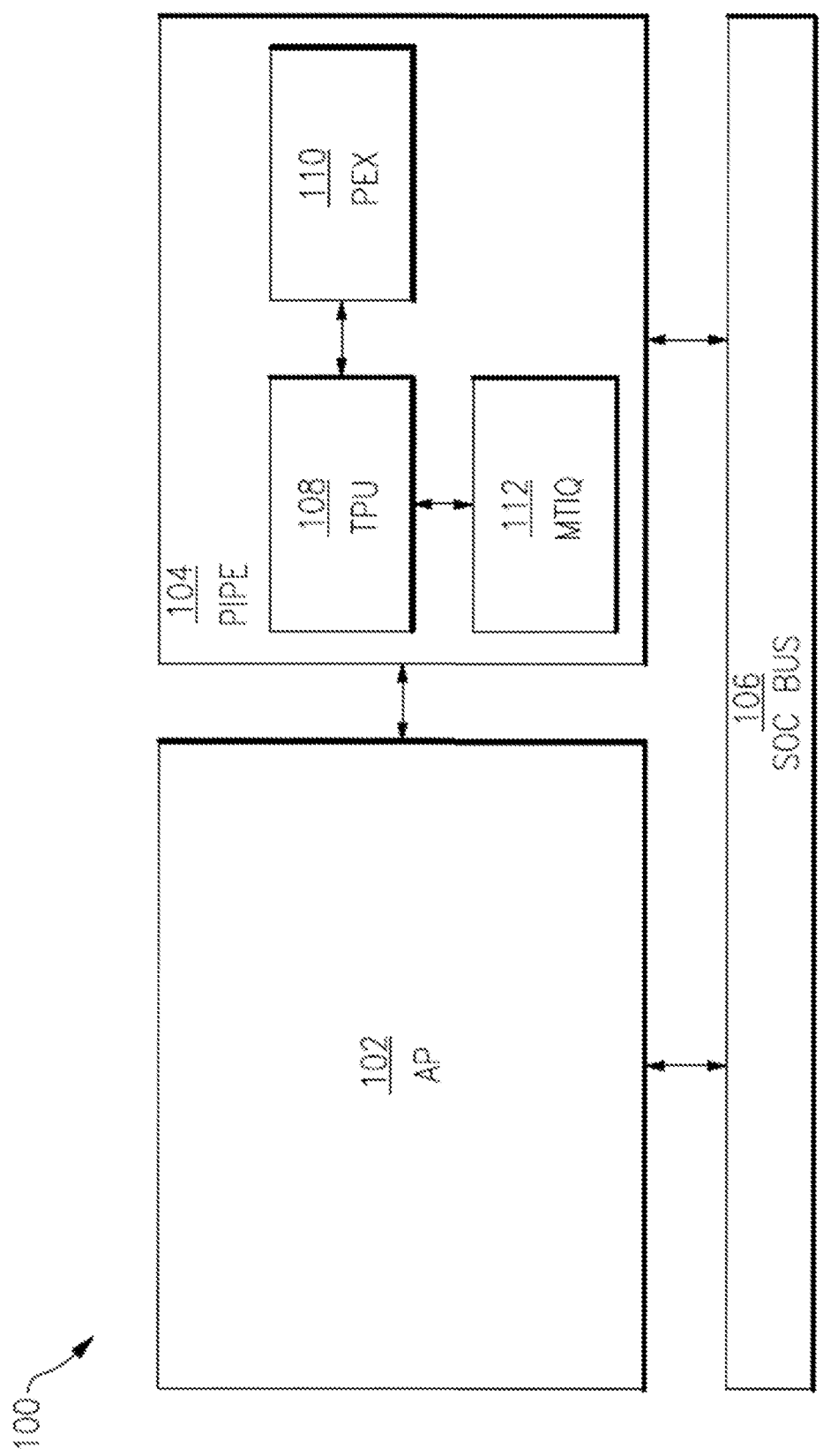
FIG. 1 illustrates a block diagram of a secure processing system according to an embodiment.

A description of example embodiments follows.

The teachings of all patents, published applications, and references cited herein are incorporated by reference in their entirety.

Aspects and examples are directed generally to computing systems with improved enforcement of policies (e.g., security policies). In one example, a host processor and a policy execution processor are connected by a processor interlock for policy enforcement. The processor interlock for policy enforcement determines if instructions committed by the host processor are compliant with a list of policy rules. If the list of rules does not include a desired rule, the policy execution processor may securely determine and provide the desired rule. In some examples, the host processor may be configured according to any instruction set architecture.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. In addition, in the event of inconsistent usages of terms between this document and documents incorporated herein by reference, the term usage in the incorporated references is supplementary to that of this document; for irreconcilable inconsistencies, the term usage in this document controls.

Computer processors are designed to receive and execute instructions. Instructions may specify one or more operations to be carried out on one or more specified operands. For example, a computer processor may receive an instruction to perform an addition operation on a first operand and a second operand, and to output the result of the addition operation to a specific output location (e.g., in memory). The first operand the second operand may be identified by respective locations (e.g., memory locations) at which the first operand and the second operand are stored. Upon retrieving the first operand and the second operand at the respective locations, the computer processor executes the addition operation and writes the result to the specified output location.

In some embodiments, instructions may be more fine-grained. As one example, a store instruction may store a value from a data register to a memory location referenced by an address from an address register. As another example, a load instruction may load a value from a memory location referenced by an address from an address register to a data register. As another example, an arithmetic instruction may operate on one or more input values stored in one or more input registers and place an output value into an output register.

In some embodiments, metadata tags may be associated with entities involved in an instruction (e.g., an instruction type, a program counter register, a memory address from which the instruction is fetched, one or more registers used by the instruction, a memory location referenced by the instruction, etc.). For example, the metadata tags may be used to determine which actions are acceptable/unacceptable, for example, to prevent security compromises. A computer processor executing the instructions may be beholden to one or more security policies which dictate how instructions with certain metadata tags are to be handled. For example, the security policies may disallow instructions with certain metadata tags because execution of the instructions may compromise system security.

Accordingly, metadata tags and security policies can prevent a computer processor from executing potentially-malicious instructions which may originate from a bad actor. However, if the computer processor executing the instructions is able to access and modify the metadata tags and/or the security policies, then a bad actor may circumvent the security policies by modifying the metadata tags, the security policies, or both, via the computer processor. The bad actor may therefore cause the computer processor to execute otherwise-disallowed instructions by manipulating the metadata tags and/or the security policies governing the computer processor.

To avoid the aforementioned problem, embodiments disclosed herein provide a processing system which includes two processors. A first processor executes instructions subject to metadata tags and security policies, but, in most circumstances, is not allowed to access the metadata tags or the security policies. A second processor accesses the metadata tags and the security policies, and determines compliance with the security policies, but does not execute instructions received by the processing system. Separation of the tasks performed by the first processor and the second processor may provide significant advantages to computer processor security and efficiency. Furthermore, systems and methods disclosed herein may allow the first processor to be implemented according to one of several supported Instruction Set Architectures (ISAs), which provides a highly flexible system.

FIG. 1 illustrates a block diagram of a computer processing system 100 according to an embodiment. The computer processing system 100 includes a host processor, sometimes also referred to as an Application Processor (AP) 102, a Processor Interlock for Policy Enforcement (PIPE) 104, and a System-On-Chip (SOC) bus 106. The AP 102, the PIPE 104, and the SOC bus 106 are communicatively coupled to one another. In some embodiments, the SOC bus 106 is configured to be communicatively coupled to one or more peripherals, one or more memory banks, and a SOC bus configuration system.

The PIPE 104 includes a Tag Processing Unit (TPU) 108, a Policy EXecution Processor (PEX) 110, and a Metadata Tag Interlock Queue (MTIQ) 112. The TPU 108 is communicatively coupled to the PEX 110 and the MTIQ 112. The PEX 110 is communicatively coupled to the TPU 108. The MTIQ 112 is communicatively coupled to the TPU 108.

In some embodiments, the AP 102 is generally configured to receive instructions, execute operations specified by the instructions, and write an output to the MTIQ 112. The AP 102 may also provide the instructions to the TPU 108. As discussed in greater detail below, the AP 102 may be unable to access metadata tags or security policies governing the instructions, and therefore unable to validate the executed instructions. In some embodiments, because the AP 102 is unable to validate the instructions, the AP 102 may not include Control and Status Registers (CSRs) which would enable the AP 102 to independently commit non-validated instructions to components external to the AP 102 prior to validation. For instance, the AP 102 may be configured to exclude one or more CSRs, and/or one or more CSRs may be disabled by disconnecting respective ports. Instead, the output write from the AP 102 is stored in the MTIQ 112, where the write is held until the instruction has been validated by the PIPE 104.

In some embodiments, the PIPE 104 is generally configured to receive retired instructions from the AP 102, and analyze the instructions to determine if the instructions comply with one or more policies (e.g., security policies). The PIPE 104 is configured to access policies and metadata tags associated with retired instructions to determine if the instructions comply with the policies. The SOC bus 106 is generally configured to route one or more signals between components connected to the SOC bus 106, including the AP 102 and the PIPE 104.

Tag Processing Unit (TPU)

In some embodiments, the TPU 108 is generally configured to perform one or more of the following functions. A first function is to act as a rule cache to process one or more input metadata tags associated with instructions provided by the AP 102. The TPU 108 writes output metadata tags to the MTIQ 112 upon successful validation of the instructions. A second function is to maintain a shadow copy of register files and CSRs that represent a shadow state of the computing system 100 as of a mostly-recently-allowed instruction. The computing system 100 may be "unwound" to the trusted shadow state if an issue (for example, an instruction which does not comply with the security policies) is detected.

In some embodiments, the PEX 110 is generally configured to perform one or more of the following functions. A first function is to execute a secure boot operation by booting a desired boot loader into the AP 102. A second function is to evaluate tags to determine and install rules into the TPU 108 when the TPU 108 fast cache does not include desired rule. A third function is to maintain a map of AP 102 memory addresses to metadata tag memory addresses.

In some embodiments, the MTIQ 112 is generally configured to receive data writes from the AP 102 and corresponding output metadata tags from the TPU 108, and output a combination of a data write and a corresponding output metadata tag. In some embodiments, the MTIQ 112 is configured to store output data received from the AP 102 until an output metadata tag is received from the TPU 108 indicating that the instruction complies with the security policies. Once the output metadata tag is received, the MTIQ 112 writes the output tag-and-data pair to a specified output address. Additionally, or alternatively, the output data may be written to an application memory address, whereas the output tag may be written to a metadata memory address corresponding to the application memory address.

As discussed in greater detail below, the MTIQ 112 enables a buffered interface to exist between the AP 102 and the PIPE 104. In some conventional systems, a host processor may be disallowed from executing subsequent instructions until a current instruction has been validated. In contrast, because the MTIQ 112 holds all outputs from the AP 102 until validation is received from the TPU 108, the AP 102 may continue executing instructions and writing outputs to the MTIQ 112 before the instruction is validated by the TPU 108. Similarly, the PIPE 104 may validate instructions independent of the rate at which the AP 102 executes instructions.

Accordingly, the AP 102 and the PIPE 104 may not be beholden to one another, and may therefore process instructions independently, yielding significant increases in processing speed. If the AP 102 and the PIPE 104 both successfully process an instruction, then the MTIQ 102 may output the validated result of the instruction to a specified destination. Otherwise, if an output from the AP 102 is disallowed by the PIPE 104, then the computing system 100 may be unwound to the shadow state of the computing system as of a most-recently-allowed instruction. Therefore, the AP 102 and the PIPE 104 may process instructions independently of one another without compromising processor security or efficiency.

Figure 2:
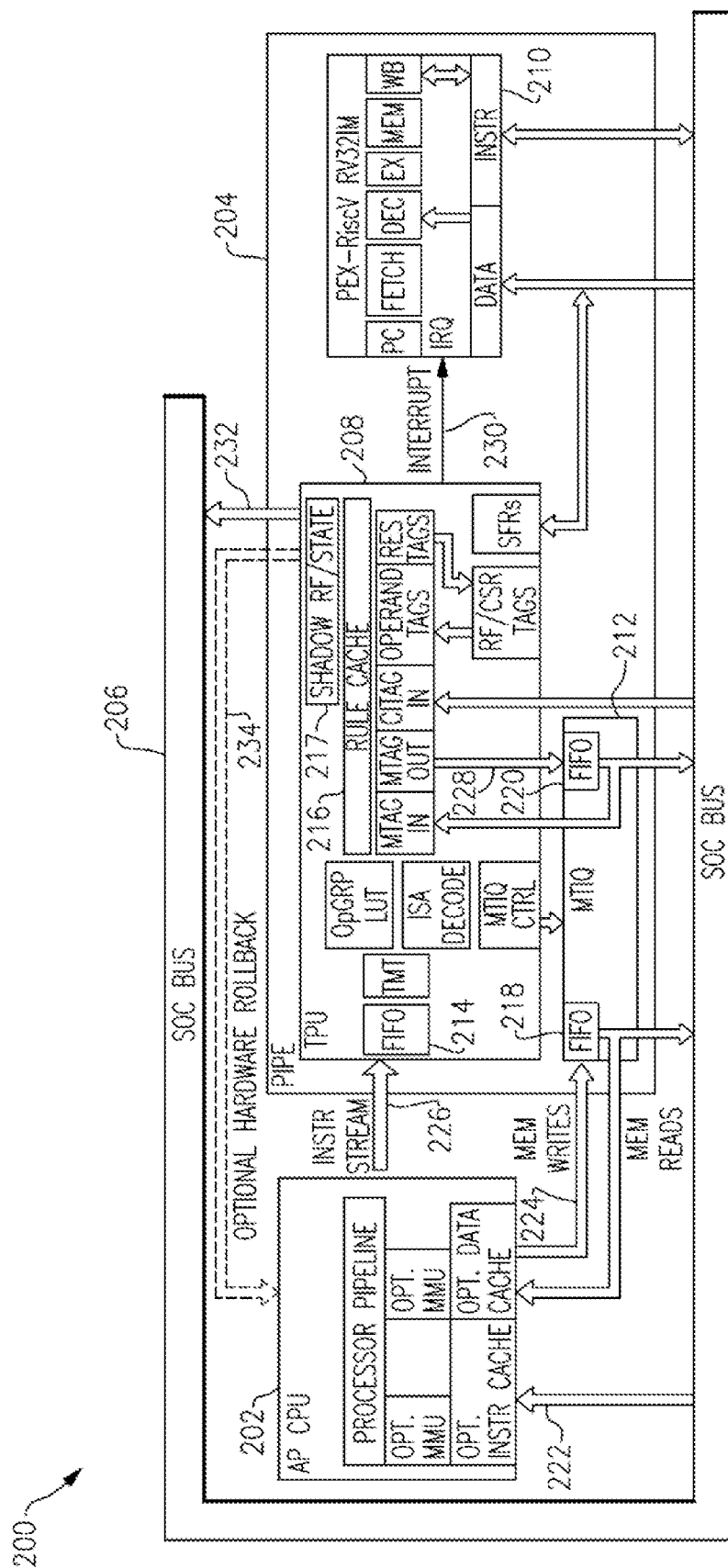
FIG. 2 illustrates a block diagram of a secure processing system according to an embodiment.

FIG. 2 illustrates a detailed block diagram of a computing system 200 according to an embodiment. The computing system 200 may represent a more detailed block diagram of the computing system 100 according to one implementation. However, alternate implementations of the computing system 100 are intended to be within the scope of this disclosure, and the computing system 200 is provided for explanatory purposes only. Certain elements and connections of the computing system 200 are identified and explained below for explanatory purposes only. For example, certain elements and connections of the computing system 200 are identified for explanation in connection with FIGS. 3A and 3B, below.

The computing system 200 includes an AP 202, a PIPE 204, and a SOC bus 206. The PIPE 204 includes a TPU 208, a PEX core 210, and an MTIQ 212. The TPU 208 includes an input first-in-first-out component (referred to herein as a "FIFO") 214, a rule cache 216, and a shadow register 217. The MTIQ 212 includes an operation output FIFO 218 and a tag FIFO 220. In some examples, the AP 202 may be part of a host processing domain, and the PIPE 204 may be part of a metadata processing domain. The processing domains may, in some embodiments, include respective memories. The FIFOs described herein may be implemented in hardware, software, or a combination of both, as is known in the art.

The AP 202 is configured to receive instructions 222 from the SOC bus 206, provide operation outputs 224 to the operation output FIFO 218, and provide instructions 226 to the input FIFO 214. The TPU 208 is configured to provide a tag output 228 to the tag FIFO 220, provide an interrupt 230 to the PEX 210, and provide a reset vector 232 to the SOC bus 206 from the shadow register 217. In some embodiments, the TPU 208 may be configured to provide a hardware rollback signal 234 to the AP 202. The PEX 210 is configured to execute policy code according to one or more signals received from the TPU 208. The MTIQ 212 is configured to receive and hold the operation outputs 224 in a queue until a corresponding tag output 228 is received.

Figure 3A:
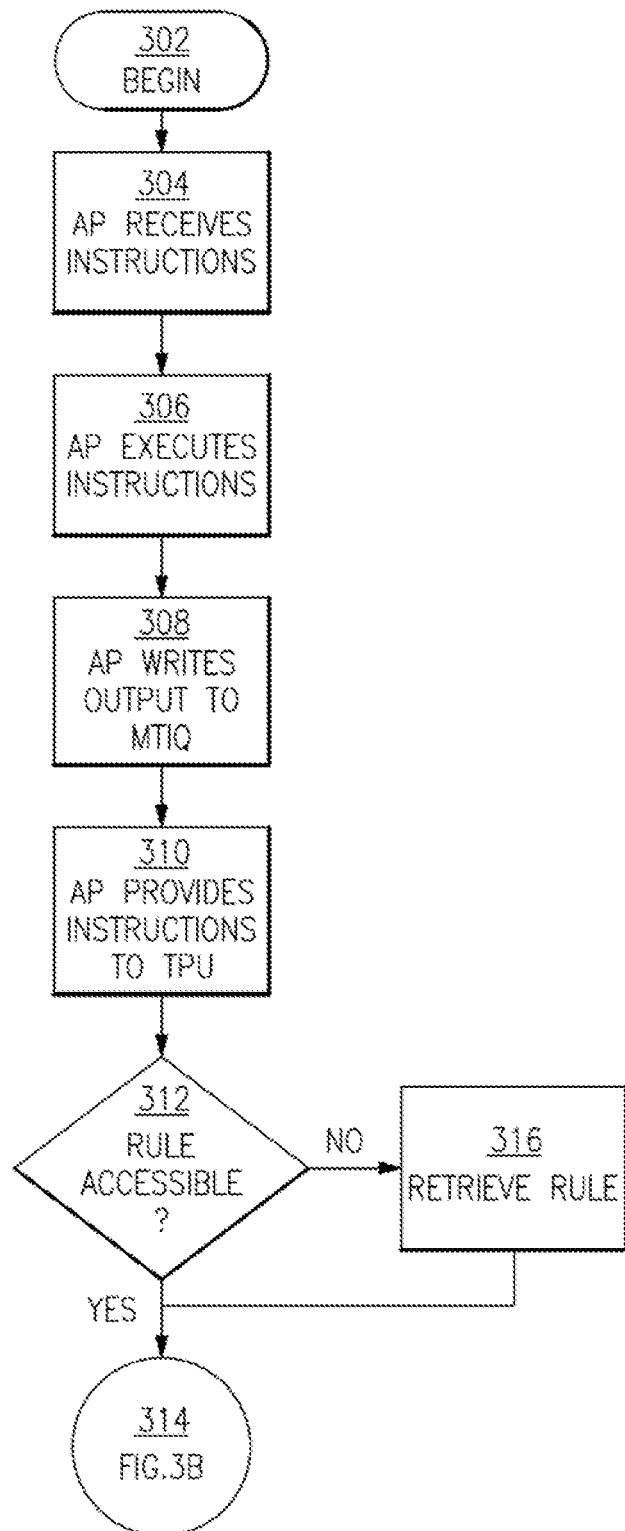
FIG. 3A illustrates a process of processing an instruction according to an embodiment.
Figure 3B:
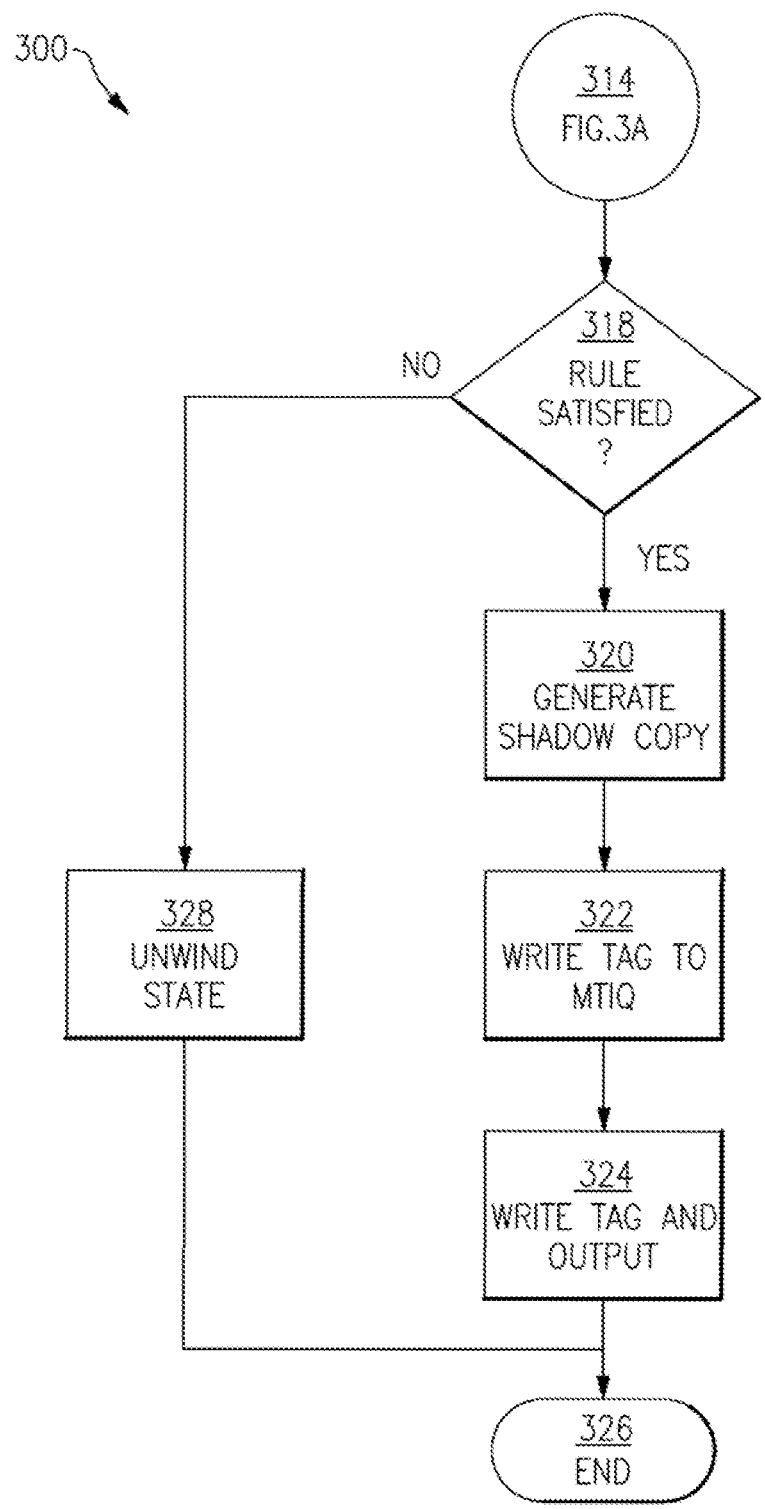
FIG. 3B illustrates a process of processing an instruction according to an embodiment.

FIGS. 3A and 3B illustrate an example process 300 of handling an instruction according to an embodiment. FIG. 3A depicts the example process from action 302 through action 314, and FIG. 3B continues the example process from action 314 ("action" is also referred to herein as "act") through action 326. The example process 300 may be executed in connection with the computing system 100 or the computing system 200. For explanatory purposes only, examples are presented in connection with the computing system 200.

At act 302, the process 300 begins, as shown in FIG. 3A. At act 304, the AP 202 receives the instructions 222. For example, the AP 202 may receive instructions 222 from components external to the computing system 200 via the SOC bus 206. At act 306, the AP 202 executes the instructions. Executing the instructions may include performing an operation specified by the instructions on operands specified by the instructions.

At act 308, the AP 202 writes an output 224 of the executed operation to the MTIQ 212. For example, the AP 202 may write the output of the executed instructions to the operation output FIFO 218 in the MTIQ 212, where the output is held in a queue until a corresponding output metadata tag is received from the TPU 208 via the tag FIFO 220, indicating that the executed instructions are consistent with one or more policies (e.g., security policies).

At act 310, the AP 202 provides the instructions 226 to the TPU 208. For example, the AP 202 may provide the instructions 226 to the input FIFO 214. At act 312, the TPU 208 analyzes a received instruction, and determines if the rule cache 216 includes an entry matching metadata tags associated with the received instruction. For example, the rule cache 216 may include a rule cache configured to store frequently-accessed rule entries. If a matching rule entry is available from the rule cache 216 (312 YES), then the process 300 continues to FIG. 3B at act 314.

Otherwise, if a matching rule entry is not available from the rule cache 216 (312 NO), then the process 300 continues to act 316. At act 316, a request may be sent to the PEX 210 to validate the received instruction. This may include providing the interrupt 230 to the PEX 210, along with the metadata tags associated with the received instruction. The PEX 210 may evaluate the metadata tags to determine whether the instruction should be allowed. Responsive to determining that the instructions should be allowed, the PEX 210 installs a new entry in the rule cache 216 with the metadata tags associated with the received instruction and/or an output metadata tag provided by the PEX 210. The process 300 continues to FIG. 3B at act 314.

FIG. 3B begins at act 314 and continues to act 318. At act 318, a determination is made by the TPU 208 as to whether a rule indicated in the matching rule catch entry has been satisfied. For example, act 318 may include applying the rule to one or more metadata tags associated with the received instruction to determine if the one or more metadata tags are in compliance with the rule. If the rule is satisfied (318 YES), then the process 300 continues to act 320. However, it should be appreciated that aspects of the present disclosure are not limited to performing a separate determination of compliance. In some embodiments, a presence of a matching rule entry in the rule cache may indicate the received instruction is allowed. Likewise, an output of the PEX 210 may directly indicate whether the received instruction is allowed. Thus, there may be no act 318 for applying a rule.

At act 320, the TPU 208 generates a shadow copy of the state of the AP 202 and stores the shadow copy in the shadow register 217. For example, the TPU 208 may write write-back information received in connection with the instruction to the shadow register 217.

The shadow copy of the AP 202 represents a state of the AP 202 as of execution of a most-recently-allowed instruction. In some embodiments, the shadow copy generated at act 320 enables the AP 202 to continue executing instructions and writing operation outputs 224 to the operation output FIFO 218 before the instructions are determined by the TPU 208 to be compliant with one or more policies. If an instruction is subsequently determined to be non-compliant with any policy, the state of the AP 202 may be unwound to the most-recently-allowed state stored in the shadow register 217 such that no non-validated data is written to components external to the computing system 200.

At act 322, the output metadata tag 228 associated with the allowed instruction is written to the MTIQ 212 by the TPU 208. For example, the TPU 208 may write the output metadata tag to the tag FIFO 220 in the MTIQ 212. The tag FIFO 220 may be coordinated with the operation output FIFO 218 such that the operation output 224 written to the operation output FIFO 218 and the metadata tag 228 written to the tag FIFO 220 respectively occupy the same position in the operation output FIFO 218 and the tag FIFO 220.

At act 324, the operation output 224 stored in the operation output FIFO 218 and the metadata tag 228 stored in the tag FIFO 220 are released. For example, operation output FIFO 218 and the tag FIFO 220 may each release a least-recently-received input representing the operation output 224 and the corresponding output metadata tag 228. The pair may be released to the SOC bus 206 to be routed to an address specified in the instruction. Additionally, or alternatively, the operation output 224 may be written to an application memory address, whereas the corresponding metadata output tag 228 may be written to a metadata memory address corresponding to the application memory address.

At act 326, the process 300 ends. Returning to act 318, if the rule is not satisfied (318 NO), then the process 300 continues to act 328. At act 328, a state of the AP 202 is unwound to a state stored in the shadow register 217, which reflects a state of the AP 202 as of a most-recently-allowed instruction. The process 300 ends at act 326.

Figure 4:
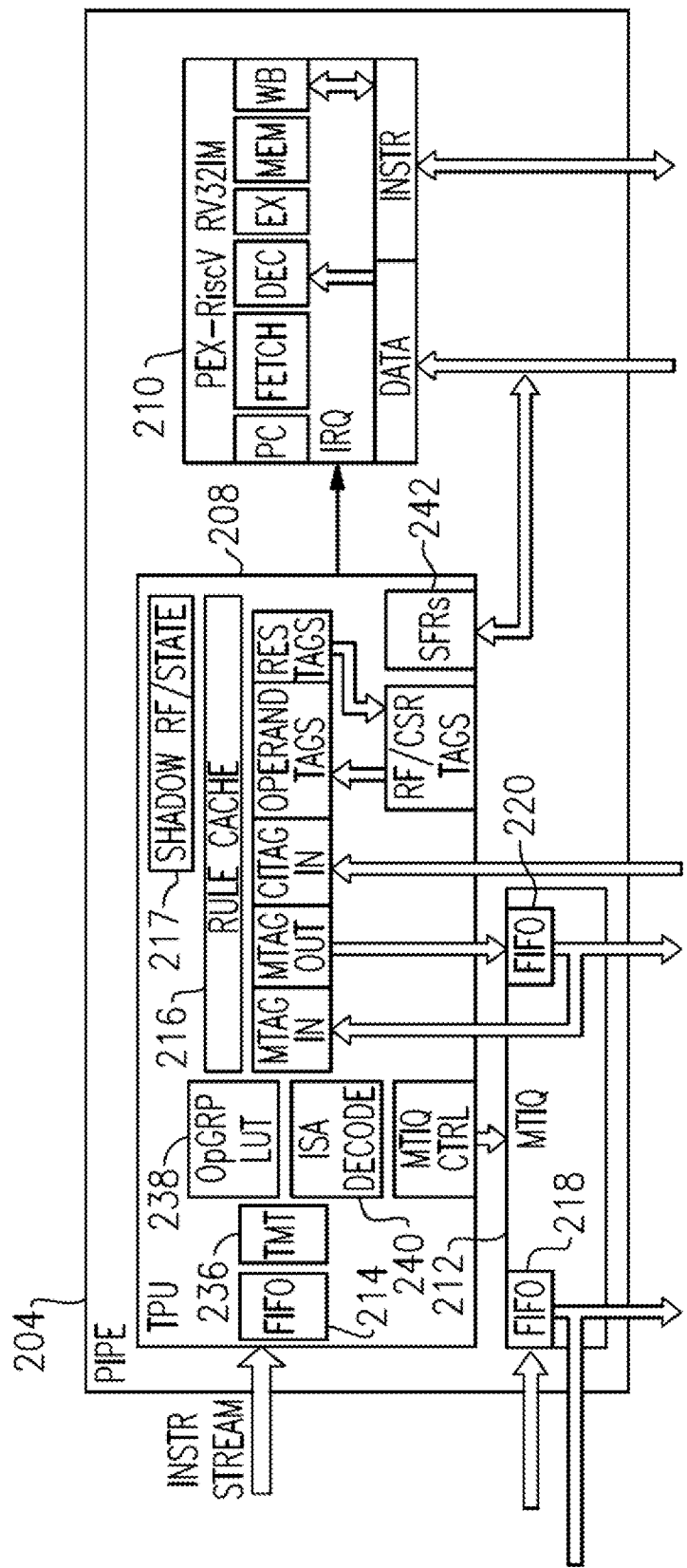
FIG. 4 illustrates a block diagram of a processor interlock for policy enforcement according to an embodiment.

Operation of the PIPE 204 will now be described in greater detail with respect to FIG. 4. FIG. 4 illustrates a block diagram of the PIPE 204, in accordance with some embodiments. The PIPE 204 includes the TPU 208, the PEX 210, and the MTIQ 212. The TPU 208 includes the input FIFO 214, the rule cache 216, and the shadow register 217. The MTIQ 212 includes the operation output FIFO 218 and the tag FIFO 220. The TPU 208 further includes a Tag Map Table (TMT) 236, an operation group/care Look-Up Table (LUT) 238, an ISA decoder 240, and Special Function Registers (SFRs) 242. However, it should be appreciated that aspects of the present disclosure are not limited to the particular combination and arrangement of elements in the example of FIG. 4. For instance, aspects of the present disclosure are not limited to using a shadow register, a tag map table, an operation group/care LUT, etc.

As discussed above, the PIPE 204 may, in some embodiments, be configured to receive input instructions from the AP 202 for each instruction that the AP 202 finishes executing. The PIPE 204 fetches tags associated with the input instructions, and checks the fetched tags against a set of rules stored in the rule cache 216. Because the PIPE 204 is decoupled from the AP 202, the PIPE 204 is able to verify tag sets after the AP 202 has retired an instruction. Due to the post-processing nature of the PIPE 204, it may be advantageous for the PIPE 204 to withhold performing any external effects of the AP 202 instructions until each instruction has been verified by the TPU 208.

Furthermore, as discussed above, a buffered interface may, in some embodiments, be provided between the AP 202 and the PIPE 204. The buffered interface enables outputs of committed instructions to be queued up from the AP 202 into the operation output FIFO 218, after which point the TPU 208 evaluates a committed instruction to determine if the instruction should be allowed, and what a result tag might be.

Because the AP 202 is allowed to process and commit instructions before the PIPE 204 verifies the instructions, the AP 202 may commit instructions which are subsequently disallowed by the PIPE 204. For situations in which a policy violation is detected, it may be advantageous to provide a mechanism to unwind the state of the AP 202 to that of a most-recently-allowed instruction once the TPU 208 detects the policy violation. To enable this, the TPU 208 may receive write-back information for each received instruction. The TPU 208 may use the write-back information to maintain a shadow copy of the register file, the floating-point register file, and/or Control/Status Registers (CSRs) in a memory, such as the shadow register 217. The shadow copy represents a trusted "back-up" state of the AP 202 which may be loaded if a policy violation is detected.

If an unwind event is required, the PEX 210 may use a PIPE register to initiate a reset or interrupt of the AP 202. If a reset is initiated, the PEX 210 may also provide the reset vector 232 pointing to code that will restore the AP 202 state from PIPE shadow state RAM, such as the shadow register 217. In some embodiments, the PIPE 204 may further provide the hardware rollback signal 234 to the AP 202 to roll back the hardware of the AP 202 to a previous trusted state. It should be understood, however, that although the example embodiments describe a example hardware-based roll-back implementation, a software-based roll-back instead of or in addition to the hardware-based implementation may also be used.

With the unwind mechanism and the MTIQ 212 in place, the AP 202 may commit instructions into register files and CSRs before the instructions are checked, because no external effects are produced and the state may be unwound if needed. Accordingly, in some embodiments, it may be advantageous to not provide the AP 202 with CSRs that may cause effects external to the AP 202, such as General Purpose Input/Output (GPIO) via CSRs. For example, the AP 202 may be configured to exclude the non-standard Berkley extension "mtohost" and "mfromhost" CSRs, and/or one or more ports to such CSRs may be disconnected.

As discussed above, the PIPE 204 includes SFRs 242. The SFRs 242 are summarized in FIGS. 7A-7E, in accordance with some embodiments. The "Address" column refers to the lower address bits. The "Bits" column indicates which bit(s) that the field occupies. When a register has more than one field in it, the row with the address will have an empty "Bits" cell, and the proceeding rows will indicate the fields for each corresponding bit location with an empty address cell. In one embodiment, all registers are 32 bits wide, and can be accessed as bytes, half-words, or words. For registers with less than 32 bits indicated, the remaining bits are reserved and may be ignored by software. However, aspects of the present disclosure are not limited to registers of any particular size, or accessing registers at any particular granularity.

In this example, there are several types of registers in the PIPE 204. Status registers include read-only registers with status and statistics. Control registers include write-only and read-only registers that initiate action from the AP 202 or the PIPE 204. The miss status registers include read-only registers that are populated with values that cause a rule cache miss. For example, the miss status registers include registers to indicate an evaluation of a rule cache ways hash function, and include bits to inform software if a valid rule is present at an indicated location. The software may therefore quickly determine if an ejection of a rule from the rule cache 216 is necessary.

In some embodiments, write command registers include a set of read/write registers used to install a new rule in the rule cache 216. For example, the new rule may be a desired rule which is not already present in the rule cache 216. The software may specify which rule cache way the rule is being installed into, such that the miss software is responsible for cache management. Key-based query registers include a set of registers for checking if a particular input set, or key, is present in any of the rule cache ways. For example, this may be advantageous where a portion of the rule cache is being used as a per-policy rule cache.

In some embodiments, address-based inspect registers include a set of registers for looking into a specific rule cache way's address and fetching the content therein. For example, this may be particularly advantageous for saving a rule before a new insertion such that the software may either re-install the rule to a different cache way, or provide the rule to a software L2 cache. Tag map table control registers include registers for writing the TMT 236, as discussed in greater detail below. The TMT 236 may, in some embodiments, be fully-associative. The operation group table control registers include registers for writing the Operation Group and Cares table, as discussed in greater detail below. The tag RAM access registers include read/write registers that memory map the tag registers maintained by the PIPE 204. Shadow RAM access registers include read/write registers that provide memory-mapped access to the PIPE's 204 shadow set of the register file and CSR RAMs.

The tables shown in FIGS. 7A through 7E depict an example set of PIPE Registers as described herein.

As described herein, the TPU 208 may, in some embodiments, be configured to receive inputs from the AP 202 for each instruction that the AP 202 finishes. The inputs are queued in the input FIFO 214, which holds instructions to be processed by the TPU 208. For example, processing by the TPU 208 may include analyzing an instruction's associated tag set to determine if the policies being enforced by the TPU 208 and the PIPE 204 allow the associated tag set. The FIFO 214 facilitates a buffered interface at the input of the TPU 208. This buffered interface allows the TPU 208 to compensate for events where the TPU 208 must be stalled (e.g., to account for data hazard events) and to compensate for events where the instruction stream 226 is stalled (e.g., due to branch events within the AP).

Figure 5:
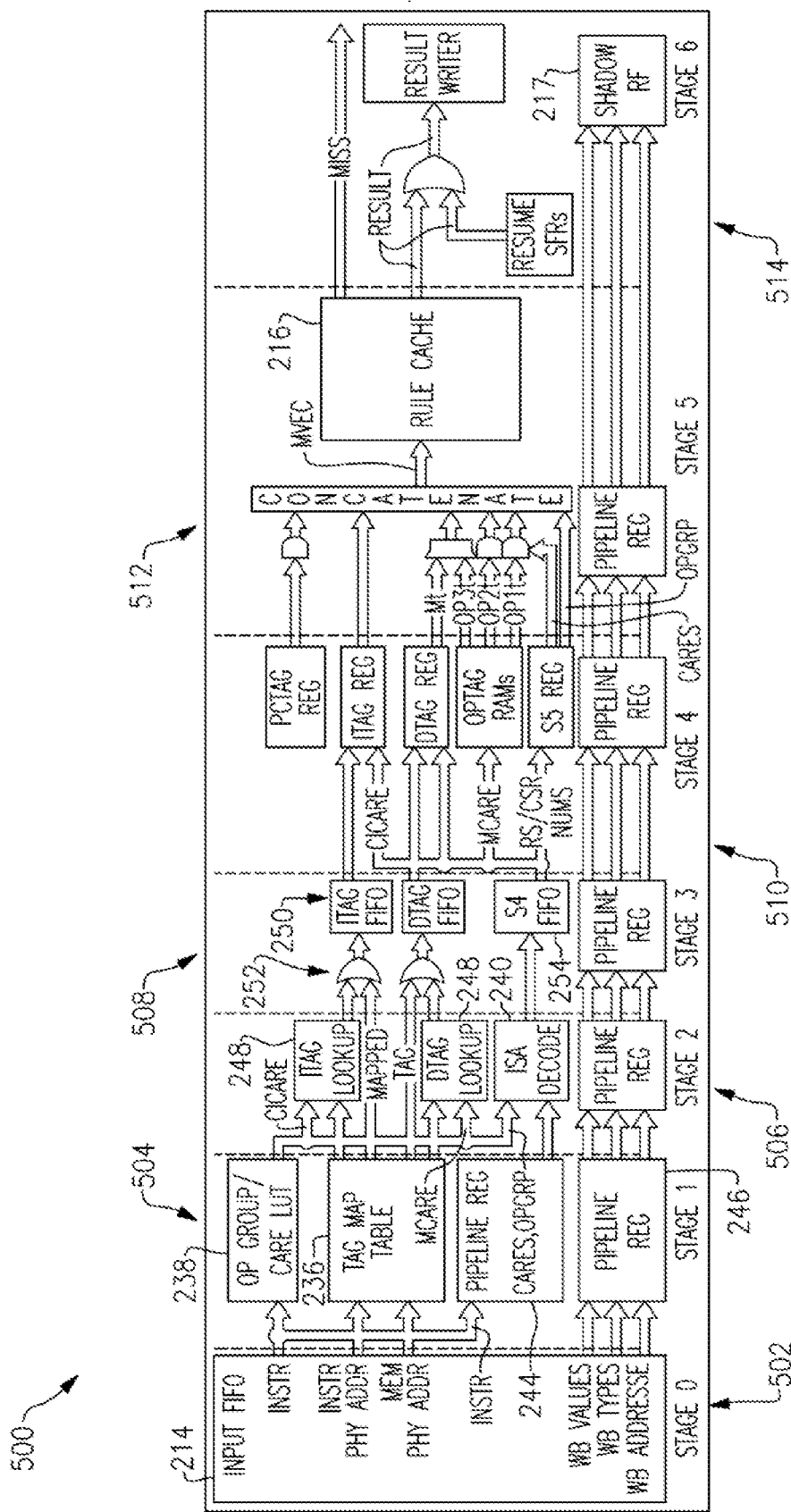
FIG. 5 illustrates a data flow diagram of tag processing according to an embodiment.

FIG. 5 illustrates a data flow diagram 500 of the TPU 208 according to an embodiment. The data flow diagram 500 is nominally divided into seven stages for purposes of explanation only. At a first stage 502, instruction types, execution results, instruction and/or data addresses, and/or write-back values flow into the input FIFO 214. For example, the instruction types, execution results, instruction and/or addresses, and/or write-back values may be received from the AP 202.

At a second stage 504, the input FIFO 214 is popped, and four events may occur. In a first event, which is described in greater detail below with respect to FIG. 6, one or more bits identifying an instruction type (e.g., opcode) are sent to the operation group/care LUT 238, which translates the instruction operation code into a group ("OPGRP") and a set of input masking bits ("CARES"). For example, the operation group/care LUT 238 may group addition and multiplication operation codes into an arithmetic operation group. Grouping similar operation codes may simplify processing in subsequent stages, because similar or identical rules may apply to a common arithmetic group. The set of masking bits, or CARES, indicate to subsequent logic that a particular instruction, data, or operand tag should be partially or completely masked before evaluation against one or more policies. For example, a jump opcode may have the CARES bits set in such a way that only one operand tag, corresponding to an operand register that holds a destination address of the jump, is used for policy evaluation for the given instruction. Tags for the remaining potential operands are to be masked or otherwise excluded from the policy evaluation.

Figure 6:
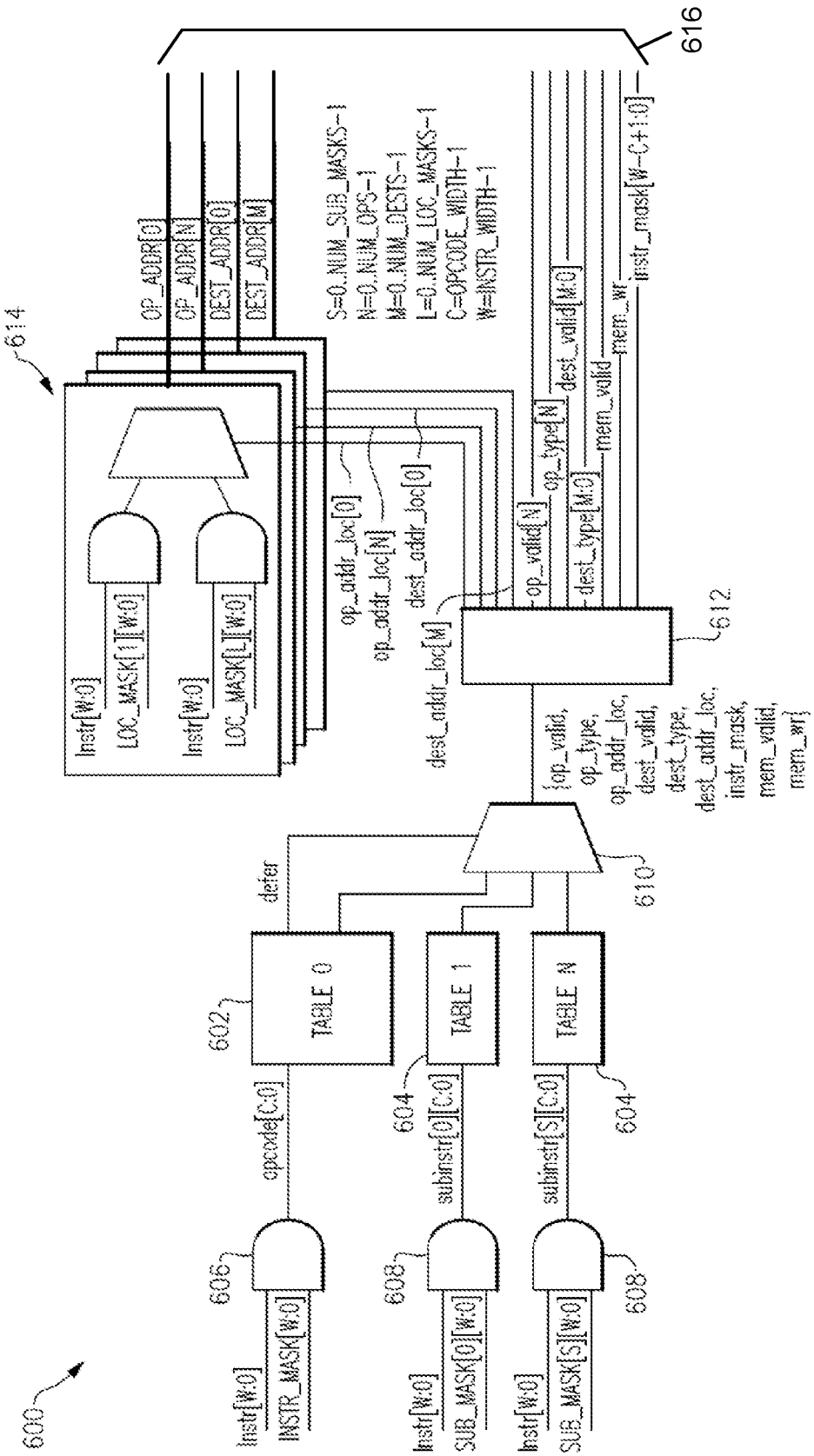
FIG. 6 illustrates a block diagram of an instruction set architecture decoding system according to an embodiment.

In a second event, which may be executed in parallel with the first event, the physical instruction address and the physical data address are translated by the TMT 236, as discussed in greater detail below with respect to FIG. 6. For example, the TMT 236 may maintain a map of physical instruction and data memory addresses to tag addresses and/or values. The TMT 236 may output either a fixed tag value (e.g., for one or more instructions or words, or an entire page of instructions or data words), or the physical address where such a tag value is located.

In a third event, instructions are provided to a pipeline register 244. The pipeline register 244 is configured to ensure that the instructions are output to a subsequent stage at an appropriate time relative to the other events in the second stage 504.

In a fourth event, write-back values, types, and addresses are passed to a write-back pipeline register 246. As discussed above, the write-back information may be indicative of a state of the AP 202. The write-back information is stored in the shadow register 217 at a final stage of the data flow diagram 500 to generate a shadow copy of the AP 202 and, if an unwind operation is necessary, the shadow copy is read from the shadow register 217 to unwind the state of the AP 202.

The write-back pipeline register 246 may ensure that the write-back information is passed along through each stage of the data flow diagram 500 as other operations are being performed on the information received at the first stage 502. Subsequent stages may also include respective write-back pipeline registers that ensure that write-back information is stored in the shadow register 217, which may be at a final stage of the data flow diagram 500, at an appropriate time (for example, when it has been determined that the instructions received in the input FIFO 214 comply with installed policies). For purposes of brevity, subsequent write-back pipeline registers 246 are not specifically discussed in detail, as they function similarly to the pipeline register 246 of the second stage 504. Alternatively, or additionally, the write-back information may be synchronized with the TPU processing pipeline by other mechanisms, such as with a first-in, first-out (FIFO) buffer.

At a third stage 506, a further four events may occur. A first event occurs when the TMT 236 returns a tag value and/or a tag address for the instruction, and a corresponding care bit for a current instruction is returned from the operation group/care LUT 238. If the TMT 236 returns a tag address, a read of an instruction metadata tag value may be thereafter initiated, and the value returned written to the instruction tag FIFO 250 (ITAG FIFO). If the TMT 236 returns a tag value, the tag value may be written directly to the ITAG FIFO as the instruction metadata tag value.

A second event occurs when the TMT 236 returns tag value and/or tag address for memory data, and a corresponding care bit for a current memory data is returned from the operation group/care LUT 238. If the TMT 236 returns a tag address, a read of the data metadata tag may be thereafter initiated, and the value returned written to the data tag FIFO 250 (DTAG FIFO). If the TMT 236 returns a tag value, the tag value provided by the TMT 236 may be written directly to the DTAG FIFO as the data metadata tag value.

In a third event, the ISA decoder 240 receives care bit information and operation group information from the operation group/care LUT 238, and receives the instructions from the pipeline register 244. A simplified ISA decode operation is executed on the instructions. The simplified ISA decode operation, which is discussed in greater detail below with respect to FIG. 6, includes the determination of which operands and destinations the instructions use, the operand and destination types and addresses, and whether memory is used, or written to, by the instructions.

In some embodiments, in the ISA decoder 240, the operand and destination addresses provided by the simplified ISA decode operation in the second stage 504 may be condensed. The operand and destination addresses may be passed through an ISA-specific address map block to map the addresses into a condensed single address space. Condensing the address space may be advantageous where addresses of the AP 202 register files and CSRs are sparsely populated and/or aliased, such that the address space may be reduced to a contiguous address space. The mapping may be used both for addressing the operand tag RAM and the shadow state RAM. FIG. 11 illustrates an example address mapping for a RISC-V AP.

In a fourth event, write-back information is pipelined by a set of pipeline registers.

At a fourth stage 508, two events may occur. In a first event, a first set of transparent FIFOs 250 receives metadata tags for instructions and/or data. The first set of transparent FIFOs 250 may be coupled to one or more logic gates 252 configured to receive tag mapping information from one of the TMT 236 and the tag lookup blocks 248, and provide the tag mapping information to the first set of transparent FIFOs 250. For example, the one or more logic gates 252 may include logical OR gates coupled to the TMT 236 and the tag lookup tables 250, and configured to output information provided by an active one of the TMT 236 and the tag lookup tables 250. The first set of transparent FIFOs 250 outputs the tag mapping information to a subsequent stage once the first set of transparent FIFOs 250 are written.

In a second event, the output of the ISA Decode 240, which includes the operand group and care bit information from the operation group/care LUT 238, is stored in a second transparent FIFO 254, which outputs the decode information to a subsequent stage once written.

At a fifth stage 510, the head of a second transparent FIFO 254 (S4 FIFO) is analyzed to determine if an instruction tag and/or metadata tag are necessary for a current instruction by analyzing corresponding care bits. The second transparent FIFO 254 is configured to provide care masking information for a current instruction tag and a metadata tag, and is configured to provide addresses for fetching Register Source (RS) tags (e.g., RS1/2/3) from a register file (RF) tags Memory(ies) corresponding to the care bits. Once all necessary inputs are available, the first set of transparent FIFOs 250 and the second transparent FIFO 254 are popped. Previous destination addresses are tracked, and a stall may be implemented to account for a data hazard (i.e., a data dependency event).

Upon all the availability of the instruction tag and/or data tag indicated as required by the S4 FIFO 254 output, care bit masking may be applied to the instruction tag and/or data tag, and the resultant tag or tags stored in the instruction tag register (ITAG REG) and data tag register (DTAG REG), respectively. Additionally, or alternatively, based on the care bits from the S4 FIFO, operand tags may be looked up by the addresses provided by the S4 FIFO 254 to the Operand TAG register file or RAM. A Program Counter Tag (PCTAG REG) register may provide an output of a program counter tag value to the subsequent state. Further, the content of the S4 FIFO 254 may be registered by a pipeline register to synchronize with the outputs of the instruction tag register.

In a sixth stage 512, three events may occur. In a first event, care masking may be applied on the RS1/2/3, memory, PC, and CI tags, and any other instruction bits not masked by the ISA decode logic. The tags, operation group, LSBs, and instruction bits may be concatenated to form a rule key (MVEC). The rule key may be hashed (e.g., by orthogonal randomizing hash functions) to produce addresses for the Rule Cache Way RAMs. In a second event, the rule may be used to read the Rule Cache 216.

At the seventh stage 514, four events may occur. In a first event, the output of each Rule Cache Way is compared against the rule key, MVEC. If no match is found, an interrupt signal, IRQ, is asserted to the PEX 210 to provide a desired rule. For example, the PEX 210 may either act as a L2 rule cache, or run a full miss handler sequence. The TPU 208 awaits an SFR.WR_RESUME signal to resume operation.

In a second event, the specified result PC tag is compared against the current PC tag. If a change is being made, a signal is sent to previous stages to invalidate the current instruction, and the fourth stage 508 unwinds the FIFO pointers to the instruction after the specified point. In a third event, any specified destination tags are written to the register file tag memory and/or the MTIQ 212. For example, destination tags may be written to the tag FIFO 220. In a fourth event, the instruction's write-back values are written from a pipeline register (for example, a pipeline register similar to the pipeline register 246) to the shadow register 217 based on the previously-translated addresses. The data flow diagram 500 terminates after completion of the seventh stage 514.

The simplified ISA decode operation, which may be executed in connection with the TMT 236, the operation output/care LUT 238, will now be described in greater detail. FIG. 6 illustrates a block diagram 600 of configurable instruction decode tables according to an embodiment. The block diagram 600 includes a primary table 602, secondary tables 604, primary logic 606, secondary logic 608, a multiplexer 610, a de-multiplexer 612, and a plurality of address lookup tables 614.

The primary logic 606 includes a first input configured to receive an instruction, a second input to receive an instruction mask, and an output configured to provide an operation code to the primary table 602. The secondary logic 608 includes, for each secondary table of the plurality of secondary tables 604, a first input configured to receive the instruction, a second input to receive a sub-instruction mask, and an output configured to provide a sub-instruction to a respective secondary table of the plurality of secondary tables 604.

The primary table 602 includes an input to receive the operation code from the primary logic 606, a first output to provide an input selection signal to the multiplexer 610, and a second output to provide extracted instruction information to the multiplexer 610. The secondary tables 604 each include an input to receive sub-instructions from respective secondary logic of the secondary logic 608, and an output to provide extracted sub-instruction information to the multiplexer 610.

The multiplexer 610 includes a plurality of inputs coupled to the primary table 602 and the secondary tables 604, an input selection connection coupled to the primary table 602, and an output coupled to the demultiplexer 612. The demultiplexer 612 has an input coupled to the multiplexer 610, and a plurality of outputs coupled to the plurality of address lookup tables 614 and an output 616. The plurality of address lookup tables 614 each include an input coupled to the demultiplexer 612 and an output coupled to the output 616.

The primary table 602 and the secondary tables 604 may be configured according to a specific ISA, and may facilitate extracting desired information from a received instruction that has been executed by the AP 202. As discussed above, the AP 202 may execute instructions according to one of several supported ISAs. As used herein, "supported ISAs" may include ISAs for which corresponding tables exist (for example, the primary table 602 or the secondary tables 604) to facilitate extracting desired ISA-specific information from received instructions.

The primary table 602 and the secondary tables 604 (collectively, the "configurable tables") may be configured in accordance with a particular ISA to facilitate interpreting a particular instruction received by the PIPE 204. In this manner, the PIPE 204 may be used in connection with performing metadata processing for any suitable and desired ISA of the AP 202 that may be used in such an embodiment. Stated another way, use of such configurable tables provides support for metadata processing and policy enforcement for any instruction set for an ISA corresponding to the AP 202. The configurable tables may be configured in accordance with the particular ISA to facilitate interpreting a particular instruction received by the PIPE 204 having a particular instruction format for the ISA of the AP 202.

For example, the configurable tables may be used to extract from the received instruction particular bits which form an operation code ("op code"). Because the particular bits which form the operation code typically vary by ISA, the configurable tables may be configured according to a particular ISA and used in connection with extracting the particular bits from the instruction which form the operation code.

In a similar manner, the configurable tables may be used to examine and extract appropriate bits of the instruction for different operands, as well as any other information to be extracted from the instruction. For example, such configurable tables may be characterized as making the PIPE 204 customizable for use with any ISA of the AP 202 by customizing the tables, along with values for particular PIPE input parameters, in accordance with the ISA and its particular instruction format or layout.

The PIPE 204 may receive, as input, instruction size information ("INSTR WIDTH"), a number of sub-operand masks ("NLTM SUB MASKS"), a number of location masks ("NUM LOC MASKS"), a maximum number of operands per instruction ("NUM_OPS"), a maximum number of write-back destinations per instruction ("NUM DESTS"), masks of bits that create the primary operation code ("INSTR MASK"), an array of sub-operand masks ("SUB_MASK"), and an array of operand and destination location masks ("LOC MASK").

To construct an operation code, the primary logic 606 may be implemented as a logical AND gate. The primary logic 606 receives, as inputs, instructions, and an instruction mask of bits that create the primary operation code. The primary logic 606 removes any bits masked by the instruction mask, concatenates the remaining bits to form the operation code, and outputs the operation code. The primary table 602, upon receiving the operation code, maps the operation code and outputs an operand validity check ("op_valid"), an operand type ("op_type"), an operand address location ("op_addr_loc"), a destination validity check ("dest_valid"), a destination type ("dest_type"), a destination address location ("dest_addr_loc"), an instruction mask ("instr_mask"), a memory validity check ("mem_valid"), a memory write ("mem_wr"), and a defer signal ("defer") that provides to an input selection terminal of the multiplexer 610.

In parallel, the secondary logic 608 may optionally be used to create sub-instructions to address the secondary tables 604. The secondary tables 604, similar to the primary table 602, receive input information, map the input information to output information, and provide the output information to the multiplexer 610.

The multiplexer 610 is configured to output information corresponding to at least one of the primary table 602 and the secondary tables 604 to the multiplexer 610. In one embodiment, the table selected is determined by an input selection signal received by the multiplexer 610. For example, the defer signal output by the primary table 602 may be utilized to select an input corresponding to one of the tables 602, 604 to provide to the output of the multiplexer 610. The multiplexer 610 outputs selected information to a de-multiplexer 612, which outputs each of the outputs discussed above to either the plurality of address lookup tables 614 or the output 616.

In some embodiments, the multiplexer 610 is configured to provide the operand address location and destination address location to the plurality of address lookup tables 614. The operand address location and destination address location indicate which of several possible instruction locations contain a necessary operand or destination address. The operand address location and destination address location are used to select a particular location mask result as a corresponding operand or destination address.

For example, each address lookup table of the plurality of address lookup tables 614 may include a multiplexer having a plurality of inputs and an input selection terminal. Each input of the multiplexer may be coupled to a different operand address. The input selection terminal may be configured to receive, for example, the operand address location signal, which is used to select a desired operand address. The multiplexer outputs the desired operand address to the output 616. Similar principles may apply, for example, to the destination address location information provided to the plurality of address lookup tables 614.

As discussed above, the secondary tables 604 may be omitted in some embodiments. For example, the secondary tables 604 may be omitted where the AP 202 is configured according to an ISA that does not include sub-instructions. Accordingly, where there are no sub-instructions, the secondary tables 604 may be unnecessary. It is to be appreciated that the number and content of the configurable tables may be customized according to a particular ISA of the AP 202.

The TMT 236 will now be described in greater detail (see, e.g., FIG. 7C and FIG. 7D). As discussed above, the TMT 236 converts physical instruction and data memory addresses into corresponding tag addresses, or directly into the tag. In some embodiments, the TMT 236 may be a fully-associative array with a parameterized number of entries. Each entry may contain a mask (MapMask) which is applied to an input address, an address which the masked input may be compared against (MapAddr), a bit to indicate if the entry is valid (MapValid), a bit to indicate if the value field is a tag or an address (MapImm), and an output value (MapValue).

The TMT 236 may be configured to receive several inputs. For example, the TMT 236 may receive an instruction physical address ("InstrPA"), a data physical address ("DataPA"), and several SFR values ("SFR_TMT_Entry," "SFR_TMT_Type," "SFR_TMT_Addr," "SFR_TMT_Mask," "SFR_TMT_Value," and "SFR_TMT_Write"). The SFR value SFR_TMT_Type may include valid bits for an instruction tag lookup, a data tag lookup, a flag to indicate when TagMapValue is an immediate tag value instead of an offset, a shift setting to apply on the masked address input, and a field to indicate the size of the tags in the region. The TMT 236 may also receive as an input "SFR_TMT_Write" from writing the SFR value "SFR_TMT_Value."

The TMT 236 may be configured to provide several outputs. For example, the TMT 236 may provide an instruction tag address or tag value ("CI_TMT_Value"). A bit ("CI_TMT_Valid") may be asserted to indicate that an instruction tag address is provided to look up an instruction tag from memory. A bit ("CI_TMT_Imm") may be asserted to indicate that an instruction tag value is written directly to the ITag FIFO of the first set of FIFOs 248.

The TMT 236 may also provide a data tag address or tag value ("Mem_TMT_Value"). A bit ("Mem_TMT_Valid") may be asserted to indicate that a data tag address is provided to look up a data tag from memory. A bit ("Mem_TMT_Imm") may be asserted to indicate that a data tag value is written directly to the DTag FIFO of the first set of FIFOs 248.

The TMT 236 may alternately provide a data tag address miss signal ("TMT_d_miss") if no data tag address is found. Similarly, the TMT 236 may provide an instruction tag address miss signal ("TMT_i_miss") if no instruction tag address is found.

When CI_TMT_Valid or Mem_TMT_Valid is asserted (i.e., when CI_TMT_Value or Mem_TMT_Value is used as an address), the inverse of the mask field may indicate how many input bits are OR'd with the output value to create the tag address. Alternatively, when an immediate value tag such as CI_TMT_Imm or Mem_TMT_Imm is asserted (i.e., when an instruction tag or data tag is written directly), the CI_TMT_Value and Mem_TMT_Value field may be used as-is as the tag. The resultant logic may be of the form:

```
Value[n]=TMT_Valid[n]&(InputPA &
TMT_Mask[n])==TMT_Addr[n];
Value[n]=TMT_Imm? TMT_Value[n]:
TMT_Value[n]|
((InputPA&~TMT_Mask[n])>>
TMT_Type.shift[n]),
``` where n ranges from 1 to the number of TMT 236 entries specified. The Value[n] of the highest-numbered entry with a set Valid[n] bit may be selected. If no Valid[n] bit is set, the PIPE 204 may issue an interrupt to the PEX 210 for a tag translation table miss, and may assert either "TMT_IMiss" and/or "TMT_DMiss" in the PipeStatus register, depending on whether the miss occurs with respect to the instruction tag or the data tag.

In embodiments in which the highest-numbered entry is selected, and in which all the foregoing comparisons are executed in parallel, several advantages may be achieved. For example, an immediate value tag may be specified for a memory region of any size, including one or more sub-regions using an address map scheme that supersedes the immediate value. This provides a mechanism for sparse tag pages in memory.

In another advantage, an immediate value tag may be specified for a region of any size, with additional immediate tags for one or more of the sub-regions. This may be useful, for example, for peripheral device tags where a sub-region of the peripheral device has additional constraints. In yet another advantage, an address mapping may be specified globally, with some region(s) of memory using an immediate tag as a means of accelerating performance of the PIPE 204 and reducing memory access power.

In some embodiments, the TMT 236 contains a single set of map entries, but uses them on two sets of inputs and outputs. A first set may be for the current instruction physical address to generate the current instruction tag physical address. The second set may be for the data physical address to generate the data tag physical address.

The operation group/care LUT 238 will now be described in greater detail. In some embodiments, the operation group/care LUT 238 may be a simple 1K entry RAM with 10 bits of output for the operation group ("OPGRP") and 33 care bits, with one for each of the rule cache 216 input fields and 22 for the rule cache instruction input. Example care bits are enumerated in table depicted in FIG. 8.

Each of the care bits shown in the table of FIG. 8 may be used to mask a corresponding input to the rule cache 216. For CItag and Mtag, no memory fetch occurs unless the care bit is set, and the output from the TMT 236 may not be written to the corresponding ITag FIFO or the DTag FIFO of the first set of FIFOs 248. The logic servicing the read side of the second FIFO 254 inspects the CItag and Mtag care bits to determine if the PIPE 204 needs to wait for the ITag and/or DTag FIFO.

In addition to saving power, this improves performance characteristics by avoiding unnecessary memory system accesses. Remaining care bits may mask the other inputs to the rule cache 216. OpTag RAM lookups may also only be performed when the corresponding care bit(s) are asserted. When a care bit is not asserted, the corresponding input field of the bit may be masked by being set to "1'b1" (i.e., not masked to zero). Masking to one may be advantageous in that it provides a means of distinguishing between masked fields and uninitialized/default fields.

In an implementation in which the AP 202 is a RISC-V core, for example, the RISC-V specific configuration of the OPtag RAMs (including dual-port for Integer, dual and single for FP, and single for CSR) is a subset of the general configuration possibilities supported by the PIPE 204. The PIPE 204 utilizes the interface parameters "*RF*" to implement an appropriate number of OPtag RAMs, widths, ports, and address bits to support various different ISAs.

As discussed above, the PEX core 210 may implement policy software which manages insertion and ejection from the rule cache 216. The TPU 208 may provide data that indicates lines of the rule cache 216 which are flagged as locked, marked invalid, and stamped with an installation count value. The TPU 208 may use this information to populate a "WrWayDest" field with a first invalid way entry, or a Least Recently Installed (LRI) entry that is not locked. The PEX core 210 may then decide to use the value as-is, or change the value to a different way number with a different algorithm utilizing the provided lock, invalid, and installation count information.

To communicate with the AP 202, the SOC bus 206, and the PEX core 210, the TPU 208 may utilize the communication interface described in the tables depicted in FIGS. 9A, 9B, 9C and 9D.

In some embodiments, the TPU 208 utilizes an ISA-specific header file to specify ISA-specific parameters about the AP 202 that the TPU 208 may benefit from being aware of. The table shown in FIG. 10 enumerates the parameters specified in this ISA-specific header file, and their corresponding values, using an example RISC-V RV32G implementation of the AP 202. The table depicted in FIG. 11 shows an example mapping between shadow memory, AP RF/CSR name, and AP RF/CSR address.

Metadata Tag Interlock Queue (MTIQ)

The MTIQ 212 will now be described in detail. As discussed above, the MTIQ 212 is generally configured to receive an operation output from the AP 202, and is configured to await a corresponding metadata tag from the TPU 208, then output the pair of the operation output and the corresponding metadata tag. In some embodiments, the MTIQ 212 may be configured according to several assumptions as set forth in the description below.

First, if there is an L1 data cache, the cache is a write-through cache that writes each value in the instruction order of the AP 202 as seen at the PIPE 204 input queue within FIFO 214.

Second, the operation outputs from the AP 202, or the L1 data cache, correspond to each instruction. Stated differently, a sequence of store-byte instructions yields a sequence of byte writes to the MTIQ 212 layer. They are not queued up into a word write by the AP 202 or L1 data cache, but rather are written by the MTIQ 212.

Third, in embodiments in which the L1 data cache is present, no writes occur when a cache line is victimized because the cache is write-through.

Fourth, the PIPE 204 processes instructions in the same order as the AP 202 as it corresponds to memory writes.

Fifth, both cacheable and non-cacheable writes flow to the MTIQ 212 in the same sequence as the instructions that create the writes.

In some embodiments, the operation output FIFO 218 has a depth equivalent to a depth of the input FIFO 214. In other embodiments, however, the operation output FIFO 218 may have a smaller depth to take advantage of the likelihood of back-to-back memory writes being low.

When the TPU 208 writes a tag to the tag FIFO 220, the MTIQ 212 pops data waiting at the top of the queue and writes both the operation output and the metadata tag out to a main memory in an atomic manner. In some embodiments, the operation output and the metadata tag should remain paired together. However, in some embodiments, it may be insufficient to write the tag either before or after the operation output. For example, data governed by a tag may change from non-secret to secret as indicated by the tag. If the tag is written first, the address is marked secret before the secret data is written, thereby ensuring that the secret data is not written without a protecting tag. Accordingly, it is advantageous to write the tag first in such a scenario.

However, consider an example in which an address with secret data is being made non-secret. It may be advantageous to change the data before changing the tag to a less restrictive tag, thereby suggesting that it may be advantageous to write the tag after the data. Accordingly, it is advantageous to write the tag second in such a scenario.

Because the MTIQ 212 is incapable of knowing which case may arise ahead of time, applying a static "data-then-tag" or "tag-then-data" scheme may be ineffective. In one embodiment, therefore, three writes are executed. A first write changes the tag address to a predetermined constant value that always indicates a write transaction is underway. A second write writes the new data. A third write writes a new tag associated with the new data. If this sequence is interrupted after the first write, then the policy software may see a tag of a predetermined constant value that indicates the interruption on the data word in question and can take appropriate action.

As discussed above, the TPU 208 may utilize an immediate tag from the TMT 236 for a store command. When an immediate tag is used, there is no tag address to send a tag update to. Accordingly, a memory tag write may be instead sent to a special address. For example, the special address may include all ones (1's). The MTIQ 212 may interpret this special address to indicate that the pending data write is allowed, and the MTIQ 212 may write the data without any tag write.

In some embodiments, the MTIQ 212 introduces a window of time in which a memory coherency violation can occur. The window of time may open in a scenario in which a store word instruction causes data to be written to the operation output FIFO 218 to await a tag. However, before the MTIQ 212 writes the word out to a main memory, a load instruction reads the same address as the pending word store.

In other words, the load instruction is attempting to read "stale" information. The load instruction will therefore read the previous, stale data from memory, instead of the "fresh" value still pending in the MTIQ 212. To prevent this, in some embodiments read requests flow through the MTIQ 212, and the MTIQ 212 stalls reads that match an address pending in the operation output FIFO 218.

The MTIQ 212 may utilize the communication information listed in the tables shown in FIGS. 12A, 12B, and 12C, with the AP 202, PIPE 204, and AXI fabric.

As discussed above, the PEX 210 may be configured to execute a secure boot operation. The PEX 210 may include boot ROM which contains code that can read an image from flash memory, authenticate and decrypt the image combined with one of a number of public keys also stored in the boot ROM, write the application to a main memory, and then enable the AP 202 to continue the boot process.

For example, the secure boot process may begin in the PEX 210. At reset, the AP 202 may stay held in reset until the PEX 210 releases the AP 202 reset via a PIPE SFR. The PEX 210 may start execution at its reset vector, typically in on-chip ROM. The PEX 210 may boot the policy software into its own memory space, configure the memory fabric protection configuration registers to define the memory regions that each initiator can access, protecting a region of memory for itself to hold policy data, initialize that policy data segment, copy a boot-loader for the AP 202 from flash into main memory at an address of the PEX core's 210 choosing, optionally install a set of rules into the PIPE 204, and finally release the AP 202 from reset. At such point, the AP 202 may start executing a boot-loader from main memory to load in an OS and applications from flash memory. Accordingly, from the very first instruction executed by the AP 202, the PIPE 204 may be checking each executed instruction against the policy rules.

The PEX 210 may be implemented according to one of several types of CPU cores. For example, the PEX 210 may be implemented as a RISC-V RV32I core. Similarly, the AP 202 may also be implemented as a RISC-V RV32I core. A selection of an implementation for the PEX core 210 and the AP 202 may vary depending on design preferences without adversely impacting operation of the computing system 200.

Having thus described several aspects of at least one embodiment, it is to be appreciated that various alterations, modifications, and improvements will readily occur to those skilled in the art. Such alterations, modifications, and improvements are intended to be within the scope of the present disclosure. Accordingly, the foregoing description and drawings are by way of example only, and the scope of the present disclosure should be determined from proper construction of the appended claims, and their equivalents.

It will be apparent that one or more embodiments described herein may be implemented in many different forms of software and/or hardware. Software code and/or specialized hardware (e.g., Application Specific Integrated Circuit, ASIC, and/or Field Programmable Gate Array, FPGA) used to implement embodiments described herein is not limiting of the embodiments of the present disclosure. Thus, to the extent the operation and behavior of embodiments are described without reference to specific software code and/or specialized hardware, it should be understood that one would be able to design software and/or hardware to implement the embodiments based on the description herein.

Further, certain embodiments of the example embodiments described herein may be implemented as logic that performs one or more functions. This logic may be hardware-based, software-based, or based on a combination of hardware and software. Some or all of the logic may be stored on one or more tangible, non-transitory, computer-readable storage media and may include computer-executable instructions that may be executed by a controller or processor. The computer-executable instructions may include instructions that implement one or more embodiments of the present disclosure. The tangible, non-transitory, computer-readable storage media may be volatile or non-volatile, and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A processing system comprising:
   (a) a host processing domain comprising a host processor configured to:
      receive at least one instruction comprising (i) operand information relating to one or more operands, and (ii) operation information indicative of an operation to be performed on the one or more operands;
      execute the operation indicated in the operation information on the one or more operands to generate operation output information; and
      provide, to a metadata processing domain, instruction information and the operation output information; and
   (b) the metadata processing domain comprising:
      a tag processing unit configured to:
         receive, from the host processing domain, the instruction information and the operation output information;
         use the instruction information to obtain one or more input metadata tags associated with the at least one instruction;
         only upon satisfaction of a rule associated with the one or more input metadata tags, generate a shadow copy of a current state of the host processor and store the shadow copy of the current state of the host processor in a shadow register; and
         when the rule associated with the one or more input metadata tags has not been satisfied, unwind the host processor according to a previous state that was stored in the shadow register.

2. The processing system of claim 1, wherein the shadow copy of the current state of the host processor comprises write-back information received in connection with the at least one instruction.

3. The processing system of claim 1, wherein the shadow copy of the current state of the host processor comprises a state of register files and control/status registers (CSRs).

4. The processing system of claim 1, wherein the previous state that was stored in the shadow register is a most-recently-allowed state of the host processor that did not violate any policy.

5. The processing system of claim 1, wherein the metadata processing domain further comprises:
   a write interlock configured to:
      receive, from the host processing domain, the operation output information; and
      place the operation output information into a queue;
   wherein the tag processing unit is further configured to:
      determine, in accordance with one or more policies being enforced and in accordance with the one or more input metadata tags associated with the at least one instruction, whether the at least one instruction is allowed; and
      responsive to a determination that the instruction is allowed, cause the queue of the write interlock to write to memory the operation output information in a manner that associates the operation output information with at least one output metadata tag.

6. The processing system of claim 5, wherein the tag processing unit comprises a rule cache configured to store one or more rule entries of at least one policy of the one or more policies enforced by the metadata processing domain.

7. The processing system of claim 6, wherein the determination that the instruction is allowed comprises:
   determine that the rule cache stores a rule entry matching the one or more input metadata tags associated with the at least one instruction.

8. The processing system of claim 7, wherein the tag processing unit is configured to use information stored in the rule entry to provide the at least one output metadata tag to be associated with the operation output information.

9. The processing system of claim 6, wherein the metadata processing domain comprises a policy execution processor, and wherein the determination that the instruction is allowed comprises:
   determine that the rule cache does not store a rule entry matching the one or more input metadata tags associated with the at least one instruction;
   responsive to a determination that the rule cache does not store a rule entry matching the one or more input metadata tags associated with the at least one instruction, provide, to the policy execution processor, the one or more input metadata tags associated the at least one instruction; and
   receive, from the policy execution processor, the at least one output metadata tag to be associated with the operation output information.

10. The processing system of claim 9, wherein the policy execution processor is configured to:
   receive, from the tag processing unit, the one or more input metadata tags associated with the at least one instruction;
   execute policy code against the one or more input metadata tags associated with the at least one instruction to determine whether the at least one instruction is allowed; and responsive to a determination that the at least one instruction is allowed, install, into the rule cache, a rule entry based on the one or more input metadata tags associated with the at least one instruction and the at least one output metadata tag.

11. The processing system of claim 9, wherein the policy execution processor is configured to execute a secure boot operation, the policy execution processor comprising a boot Read Only Memory (ROM) that stores one or more public keys, and stores code that can (i) read an image from an external memory device, authenticate and decrypt the image using the one or more public keys, and enable the host processor to continue its boot process upon successful authentication and decryption.

12. The processing system of claim 11, wherein the boot operation comprises:
at reset, the host processor remains held in a reset state;
the policy execution processor:
  (i) starts execution at its reset vector;
  (ii) boots policy software into its own memory space;
  (iii) configure one or more memory fabric protection configuration registers to define memory regions that each initiator can access, to protect a region of memory to hold a policy data segment;
  (iv) initialize the policy data segment;
  (v) copy a boot-loader for the host processor from the external memory device into main memory; and
  (vii) release the host processor from the reset state.

13. The processing system of claim 5, wherein:
the host processor is further configured to provide, to the metadata processing domain, update information indicative of one or more updates to the host processor's state as a result of executing the at least one instruction; and
the metadata processing domain is further configured to, responsive to a determination that the at least one instruction is allowed, use the update information to update a shadow register configured to store a shadow copy of the host processing domain as of a most-recently-allowed instruction.

14. The processing system of claim 13, wherein the at least one instruction comprises a first instruction, the instruction information comprises first instruction information, and the one or more input metadata tags comprise one or more first input metadata tags, and wherein the tag processing unit is further configured to:
receive, from the host processing domain, second instruction information relating to a second instruction executed by the host processor;
use the second instruction information to obtain one or more second input metadata tags associated with the second instruction;
determine, in accordance with the one or more policies being enforced and in accordance with the one or more second metadata tags associated with the second instruction, whether the second instruction is allowed; and
responsive to a determination that the second instruction is not allowed, communicate one or more rollback signals to the host processing domain to restore a state of the host processing domain to the shadow copy of the host processing domain.

15. The processing system of claim 5, wherein the one or more input metadata tags are inaccessible to the host processor.

16. The processing system of claim 5, wherein the instruction information comprises at least one piece of information selected from a group consisting of:
information indicative of an instruction type of the at least one instruction;
information indicative of a memory address from which the at least one instruction was fetched;
information indicative of one or more registers used by the at least one instruction; and
information indicative of a memory address referenced by the at least one instruction.

17. The processing system of claim 1, wherein the tag processing unit further comprises at least one look-up table configured to determine, based on the instructions, instruction care bit information indicative of one or more care bits, and operation group information indicative of an operation group.

18. The processing system of claim 1, wherein the tag processing unit is further configured to determine, based on the at least one decode table, that the instructions are formatted in accordance with the first instruction set architecture.

19. The processing system of claim 18, wherein a determination that the instructions are formatted in accordance with the first instruction set architecture is further based on the instruction care bit information indicative of the one or more care bits and the operation group information indicative of an operation group.

20. The processing system of claim 18, wherein the at least one decode table comprises a cascade of tables of at least a primary table, a secondary table, and a plurality of address lookup tables.

* * * * *